United States Patent
Teyeb et al.

(10) Patent No.: US 9,510,248 B2
(45) Date of Patent: Nov. 29, 2016

(54) NODE AND METHOD FOR SELECTIVE HANDOVER

(71) Applicant: Telefonaktiebolaget L M Ericsson (publ), Stockholm (SE)

(72) Inventors: Oumer Teyeb, Solna (SE); Angelo Centonza, Winchester (GB);
(Continued)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 242 days.

(21) Appl. No.: 14/006,899

(22) PCT Filed: Jul. 17, 2013

(86) PCT No.: PCT/SE2013/050911
§ 371 (c)(1),
(2) Date: Sep. 23, 2013

(87) PCT Pub. No.: WO2014/021764
PCT Pub. Date: Feb. 6, 2014

(65) Prior Publication Data
US 2014/0293958 A1    Oct. 2, 2014

Related U.S. Application Data

(60) Provisional application No. 61/678,772, filed on Aug. 2, 2012.

(51) Int. Cl.
*H04W 36/00* (2009.01)
*H04W 76/04* (2009.01)
(Continued)

(52) U.S. Cl.
CPC ..... *H04W 36/0055* (2013.01); *H04W 36/0072* (2013.01); *H04W 36/24* (2013.01);
(Continued)

(58) Field of Classification Search
CPC .............. H04W 36/08; H04W 76/062; H04W 36/0016; H04W 84/045; H04W 76/06; H04W 8/02; H04W 76/066
See application file for complete search history.

(56) References Cited

U.S. PATENT DOCUMENTS

2009/0170426 A1    7/2009   Jung et al.
2009/0186613 A1    7/2009   Ahn et al.
(Continued)

FOREIGN PATENT DOCUMENTS

| WO | 2010003501 A2 | 1/2010 |
| WO | 2011120559 A1 | 10/2011 |
| WO | WO 2011120559 A1 * | 10/2011 |

OTHER PUBLICATIONS

ETSI, 3GPP TS 36.413, Jun. 2011, version 10.2.0 Release 10.*
(Continued)

*Primary Examiner* — Jung-Jen Liu
(74) *Attorney, Agent, or Firm* — Murphy, Bilak & Homiller, PLLC

(57) ABSTRACT

Example embodiments presented herein are directed towards a target base station (401B), a source base station (401A) and a core network node (110, 111, 115) for providing a selective handover for a sub-set of bearers associated with a wireless terminal (101). Example embodiments further comprises utilizing path switch messaging to provide information on which bearers have been switched or handed over to the target base station and which bearers are to remain connected with the source base station.

26 Claims, 20 Drawing Sheets

(72) Inventors: Fredrik Gunnarsson, Linköping (SE);
Niklas Johansson, Sollentuna (SE);
Stefan Wager, Espoo (FI); Pontus Wallentin, Linköping (SE)

(51) Int. Cl.
*H04W 36/24* (2009.01)
*H04W 36/28* (2009.01)
*H04W 36/04* (2009.01)

(52) U.S. Cl.
CPC ....... *H04W 76/045* (2013.01); *H04W 36/0027* (2013.01); *H04W 36/04* (2013.01); *H04W 36/28* (2013.01)

(56) References Cited

U.S. PATENT DOCUMENTS

| | | | |
|---|---|---|---|
| 2009/0225723 A1 | 9/2009 | Tenneti et al. | |
| 2010/0062774 A1* | 3/2010 | Motegi | H04W 36/02 455/437 |
| 2010/0157944 A1* | 6/2010 | Horn | 370/331 |
| 2010/0265912 A1 | 10/2010 | Mildh et al. | |
| 2010/0303039 A1 | 12/2010 | Zhang et al. | |
| 2010/0304682 A1 | 12/2010 | Choi et al. | |
| 2011/0011329 A1 | 1/2011 | Kim et al. | |
| 2011/0086639 A1 | 4/2011 | Kalervo Hamalainen et al. | |
| 2011/0113299 A1 | 5/2011 | Power et al. | |
| 2011/0158121 A1 | 6/2011 | Casati et al. | |
| 2011/0194462 A1* | 8/2011 | Wu | 370/259 |
| 2011/0207456 A1 | 8/2011 | Radulescu et al. | |
| 2011/0268007 A1 | 11/2011 | Barany et al. | |
| 2011/0274087 A1* | 11/2011 | Liang | H04W 76/064 370/331 |
| 2012/0076121 A1* | 3/2012 | Choi | H04W 76/062 370/338 |
| 2012/0088505 A1 | 4/2012 | Toh et al. | |
| 2012/0100858 A1 | 4/2012 | Qin | |
| 2012/0106388 A1 | 5/2012 | Shimezawa et al. | |
| 2012/0108240 A1 | 5/2012 | Liu et al. | |
| 2012/0165013 A1* | 6/2012 | Nishida | H04W 76/068 455/435.1 |
| 2012/0182912 A1 | 7/2012 | Watfa et al. | |
| 2013/0070731 A1* | 3/2013 | Lim | H04W 36/00 370/331 |
| 2013/0107863 A1 | 5/2013 | Faccin et al. | |
| 2013/0143574 A1 | 6/2013 | Teyeb et al. | |
| 2013/0170474 A1* | 7/2013 | Bi | H04W 36/0055 370/332 |
| 2013/0176853 A1 | 7/2013 | Mahr | |
| 2013/0201904 A1 | 8/2013 | Toskala et al. | |
| 2013/0260811 A1 | 10/2013 | Rayavarapu et al. | |
| 2013/0272268 A1* | 10/2013 | Xu | H04W 76/066 370/331 |
| 2013/0322325 A1* | 12/2013 | Hahn | H04W 36/0055 370/315 |
| 2013/0337812 A1* | 12/2013 | Pekonen | H04W 76/062 455/436 |
| 2014/0211619 A1* | 7/2014 | Suryavanshi | H04W 76/068 370/230 |
| 2014/0213264 A1* | 7/2014 | Park | H04W 36/0055 455/438 |
| 2014/0219248 A1 | 8/2014 | Reddiboyana et al. | |
| 2014/0357274 A1 | 12/2014 | Teng et al. | |

OTHER PUBLICATIONS

ETSI, 3GPP TS 29.274 , Jun. 2012, V11.3.0.*
Luo, W., et al., "A CoMP soft handover scheme for LTE systems in high speed railway," EURASIP Journal on Wireless Communications and Networking 2012. Jun. 13, 2012. pp. 1-5.

* cited by examiner

NODE AND METHOD FOR SELECTIVE HANDOVER

TECHNICAL FIELD

Example embodiments presented herein are directed towards a source base station, a core network node, and a target base station, as well as corresponding methods therein, for providing a selective handover for a sub-set of bearers associated with a wireless terminal.

BACKGROUND

With the proliferation of user friendly smart phones and tablets, the usage of high data rate services such as video streaming over the mobile network is becoming common place, greatly increasing the amount of traffic in mobile networks. Thus, there is a great urgency in the mobile network community to ensure that the capacity of mobile networks keeps increasing along with the ever-increasing user demand. The latest systems such as Long Term Evolution (LTE), especially when coupled with interference mitigation techniques, have spectral efficiencies very close to the theoretical Shannon limit. The continuous upgrading of current networks to support the latest technologies and densifying the number of base stations per unit area are two of the most widely used approaches to meet the increasing traffic demands.

Yet another approach that is gaining high attention is to use Heterogeneous Networks where the traditional pre-planned macro base stations (known as the macro layer) are complemented with several low-powered base stations that may be deployed in a relatively unplanned manner. The 3rd Generation Partnership Project (3GPP) has incorporated the concept of Heterogeneous Networks as one of the core items of study in the latest enhancements of LTE, such as LTE release 11 and several low-powered base stations for realizing heterogeneous networks such as pico base stations, femto base stations (also known as home base stations or HeNBs), relays, and RRHs (remote radio heads) have been defined. The initial discussion for LTE release 12 has already started and one of the proposed items for study is the possibility of serving a user equipment (UE) from more than one eNB simultaneously. The current legacy handover mechanisms of LTE have to be updated in order to support this.

FIG. 1 provides an example of a heterogeneous network where a mobile terminal 101 uses multiple flows, e.g. an anchor flow from the macro base station (or "anchor eNB") 401A and a assisting flow from a pico base station (or a "assisting eNB") 401B. One of the problems in using a heterogeneous network is how to map the user plane bearers on the anchor flow and assisting flow, respectively. The simple solution is that each bearer is mapped on a single flow, for example, the first bearer uses the anchor flow and the second bearer uses the assisting flow.

SUMMARY

LTE currently supports only one to one connections between user equipments and eNBs. As such, when a handover is initiated, the target is asked to admit all the bearers of the user equipment. If for some reason, such as overload situation, that some of the bearers can't be admitted at the target, the source can either cancel the handover (and possibly try another candidate target) or accept it and handover the user equipment to the target, which will result in the dropping of the non-admitted bearers. This may have severe consequences on the overall experience of the user.

Current specifications do not allow the setup of bearers in parallel and in multiple eNBs for the same user equipment, which is needed for enabling multiple connectivity. This would allow an optimal distribution of bearers depending on their QoS and UL/DL requirements. Some of the example embodiments address the required changes in the communication between the eNBs and the CN to enable the possibility to connect a user equipment to multiple eNBs.

At least one example advantage of some of the example embodiments presented herein is the possibility to keep all the user equipment bearers ongoing as the bearers that the target was not able to admit may be kept at the source. A further example advantage is the possibility to trigger handover at a bearers level rather than at user equipment level. For example, the source eNB may keep the bearers that cannot tolerate discontinuity such as VoIP services with itself until the radio conditions of the source are at a much lower quality than the target, while bearers that are very capacity hungry but more tolerant to interruptions, such as file downloads, may be handed over to the target even if the radio conditions at the source are not that bad.

A further example advantage may be the possibility to maintain the control plane at one eNB, while sharing the data load at several eNBs. This opens several opportunities such as network sharing. For example, several operators may share the pico nodes for data bearers, while maintaining the signaling radio bearers only at their macros.

A further example advantage is providing control plane diversity, such as, the sending of handover commands from the source and/or targets or the sending of the measurement report towards targets becomes rather straightforward with multiple connectivity.

Yet a further example advantage is that the RLF on the assisting node or anchor node may be recovered faster. Assister recovery is straightforward as the user equipment context resides at the anchor, and anchor recovery also becomes fast as the assisting node may fetch the context easily from the network.

Accordingly, some of the example embodiments are directed towards a method, in a target base station, for providing a handover of a sub-set of bearers associated with a wireless terminal. The sub-set of bearers is less than or equal to all bearers associated with the wireless terminal. The method comprises establishing a connection for the sub-set of bearers associated with the wireless terminal via a selective handover procedure. The method also comprises receiving, from a source base station or a wireless terminal, a handover completion message for the sub-set of bearers associated with the wireless terminal. The method further comprises sending, to a core network node, a path switch request. The path switch request comprises an indication that a selective handover procedure was performed, wherein at least one bearer associated with the wireless terminal remains connected to the source base station.

Some of the example embodiments are directed towards a target base station for providing a handover of a sub-set of bearers associated with a wireless terminal. The sub-set of bearers is less than or equal to all bearers associated with the wireless terminal. The target base station comprises processing circuitry configured to establish a connection for the sub-set of bearers associated with the wireless terminal via a selective handover procedure. The target base station further comprises radio circuitry configured to receive, from a source base station or a wireless terminal, a handover completion message for the sub-set of bearers associated with the wireless terminal. The radio circuitry is further configured to send, to a core network node, a path switch request. The path switch request comprises an indication that a selective handover procedure was performed, wherein at least one bearer associated with the wireless terminal remains connected to the source base station.

Some of the example embodiments are directed towards a method, in a core network node, for providing a path switch or relocation of a sub-set of bearers associated with a wireless terminal. The sub-set of bearers is less than all bearers associated with the wireless terminal. The method comprises receiving, from a target base station, a path switch request for the sub-set of bearers associated with the wireless terminal. The path switch request comprises an indication that a selective handover procedure was performed. The method further comprises maintaining an association with bearers which are not comprised in the sub-set of bearers.

Some of the example embodiments may be directed towards a core network node, for providing a path switch or relocation of a sub-set of bearers associated with a wireless terminal. The sub-set of bearers is less than all bearers associated with the wireless terminal. The core network node comprises radio circuitry configured to receive, from a target base station, a path switch request for the sub-set of bearers associated with the wireless terminal. The path switch request comprises an indication that a selective handover procedure was performed. The core network node further comprises processing circuitry configured to maintain an association with bearers which are not comprised in the sub-set of bearers.

Some of the example embodiments may be directed towards a method, in a source base station, for providing a handover of a sub-set of bearers associated with a wireless terminal. The sub-set of bearers is less than or equal to all bearers associated with the wireless terminal. The method comprises receiving, from a target base station or a core network node, a path switch acknowledgement message. The path switch acknowledgement message comprises a result of a selective handover procedure for each bearer of the sub-set of bearers. The method further comprises maintaining an association of at least one failed bearer of the sub-set of bearers, wherein the core network node is unable to switch the at least one failed bearer to the target base station via the selective handover procedure.

Some of the example embodiments may be directed towards a source base station for providing a handover of a sub-set of bearers associated with a wireless terminal. The sub-set of bearers is less than or equal to all bearers associated with the wireless terminal. The source base station comprises radio circuitry configured to receive, from a target base station or a core network node, a path switch acknowledgement message. The path switch acknowledgement message comprises a result of a selective handover procedure for each bearer of the sub-set of bearers. The source base station further comprises processing circuitry configured to maintain an association of at least one failed bearer of the sub-set of bearers, wherein the core network node is unable to switch the at least one failed bearer to the target base station via the selective handover procedure.

DEFINITIONS

3GPP 3rd Generation Partnership Project
AMBR Aggregate Maximum Bit Rate
AP Application Protocol
APN Access Point Name
ARP Allocation and Retention Priority
ARQ Automatic Repeat reQuest
BCH Broadcast Channel
CIO Cell Individual Offset
CN Core Network
CRS Cell specific Reference Symbol
CSG Closed Subscriber Group
DL Downlink
DM Demodulation
DRB Data Radio Bearer
E-RAB E-UTRAN Radio Access Bearers
E-UTRA Evolved Universal Terrestrial Radio Access
E-UTRAN Evolved UMTS Terrestrial Radio Access Network
eNB/eNodeB enhanced Node B (base station)
EPC Evolved Packet Core
EPS Evolved Packet System
EMM Evolved Packet System Connection Management
GBR Guaranteed Bit Rate
GUMMEI Globally Unique Mobility Management Entity Identifier
HARQ Hybrid Automatic Repeat reQuest
HeNB Home eNB
HO Handover
HOM Handover Margin
HSPA High-Speed Packet Access
IE Information Element
ID Identity
IP Internet Protocol
LTE Long Term Evolution
MAC Medium Access Control
MBR Maximum Bit Rate
MME Mobility Management Entity
MTCP Multi-path Transmission Control Protocol
NAS Non-Access Stratum
OAM Operation and Maintenance
PGW PDN Gateway
PBCH Physical Broadcast CHannel
PCell Primary Cell
PCFICH Physical Control Format Indicator CHannel
PCI Physical Cell Identity
PDCCH Physical Downlink Control CHannel
PDCP Packet Data Convergence Protocol
PDN Packet Data Network
PDSCH Physical Downlink Shared CHannel
PDU Packet Data Unit
PHICH Physical Hybrid ARQ Indicator CHannel
PSS Primary Synchronization Signal
QCI QoS Class Identifier
QoS Quality of Service
RLC Radio Link Control
RAB Radio Access Bearer
RAT Radio Access Technology
RE Resource Element
RLC Radio Link Control
RLF Radio Link Failure
RRC Radio Resource Control
RRH Remote Radio Head
RRM Radio Resource Management
RS Reference Signal
RSCP Received Signal Code Power
RSRP Reference Signal Received Power
RSRQ Reference Signal Received Quality
Rx Receive
SGW Serving Gateway
SCell Secondary Cell
SCTP Stream Control Transmission Protocol
SDF Service Data Flow SDU Service Data Unit
SFN System Frame Number
SINR Signal to Interference plus Noise Ratio
SRB Signaling Radio Bearer
SRVCC Single Radio Voice Call Continuity
SSS Secondary Synchronization Signal
TCP Transmission Control Protocol
TTT Time To Trigger
Tx Transmit
UE User Equipment
UL Uplink
UMTS Universal Mobile Telecommunications System
UTRA Universal Terrestrial Radio Access
UTRAN Universal Terrestrial Radio Access Network
VoIP Voice over Internet Protocol

BRIEF DESCRIPTION OF THE DRAWINGS

The foregoing will be described in more detail with from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1:
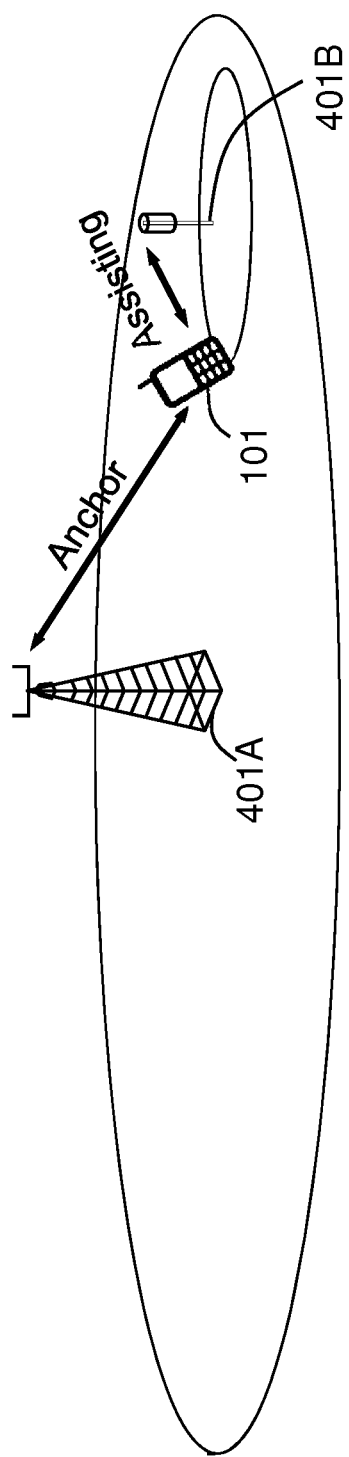
FIG. 1 is an illustrative example of a heterogeneous deployment with simultaneous anchor and assisting flows to a wireless terminal.
Figure 2:
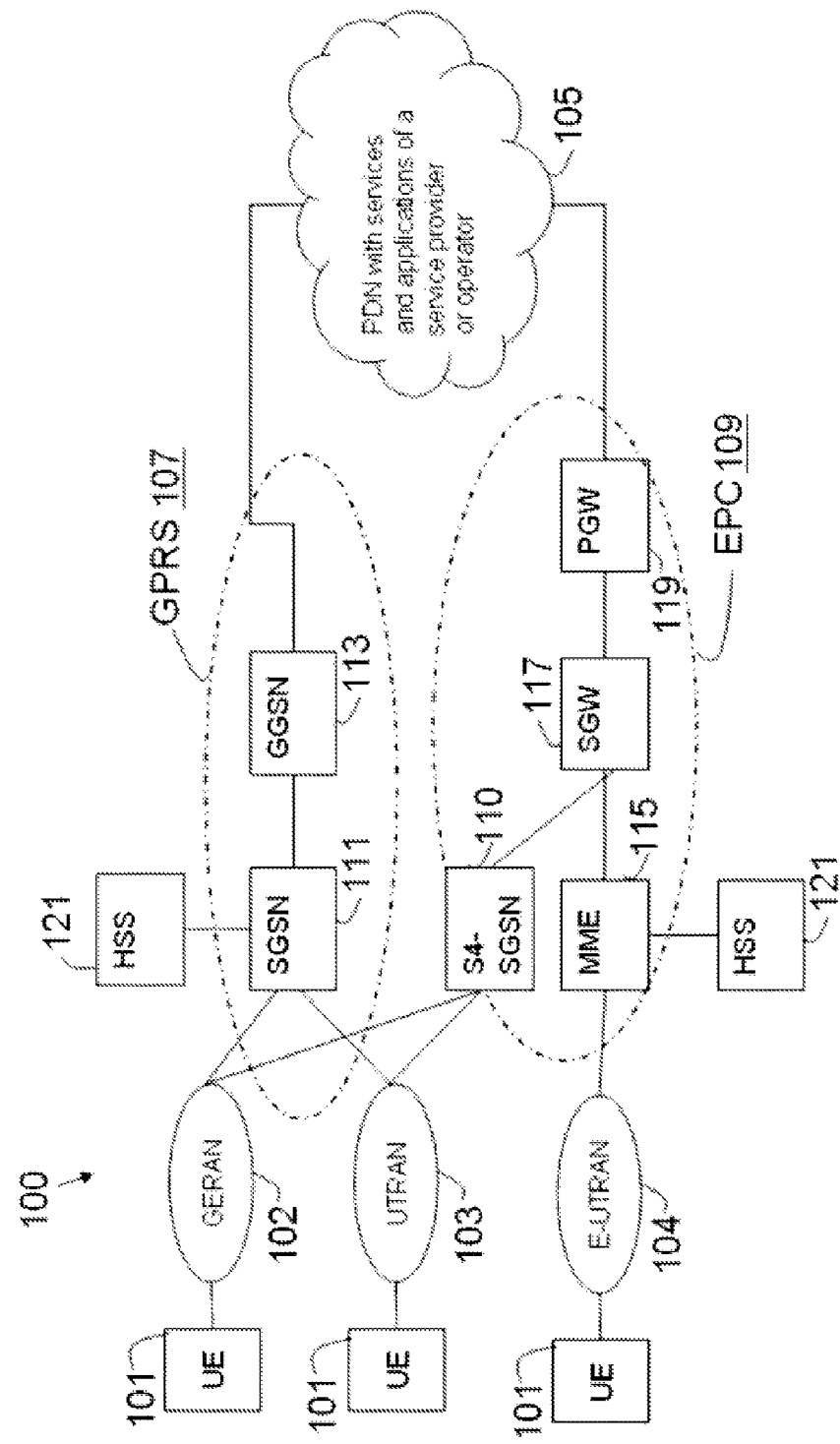
FIG. 2 is an illustrative example of a wireless network.

In the following description, for purposes of explanation and not limitation, specific details are set forth, such as particular components, elements, techniques, etc. in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments.
General Overview In order to better explain the example embodiments presented herein, a problem will first be identified and discussed. FIG. 2 provides a general example of a communication network 100. As shown in FIG. 2, a user equipment (UE), or wireless terminal 101, may be in communication with a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to an operator or service provider 105, the UTRAN/E-UTRAN/GERAN subsystem 102-104 may be in communication with a General Packet Radio Service (GPRS) subsystem 107 or an Evolved Packet Core (EPC) subsystem 109. It should also be appreciated that the network may further comprise a WiFi subsystem, although not illustrated in FIG. 2.

The GPRS subsystem 107 may comprise a Serving GPRS Support Node (SGSN) 111, which may be responsible for the delivery of data packets to and from the mobile stations within an associated geographical service area. The SGSN 111 may also be responsible for packet routing, transfer, mobility management and connectivity management. The GPRS subsystem 107 may also include a Gateway GPRS Support Node 113, which may be responsible for the interworking between the GPRS subsystem 107 and the PDN 105.

The EPC subsystem 109 may comprise a Mobility Management Entity 115, which may be responsible for mobility management, connectivity management, idle mode UE tracking, paging procedures, attachment and activation procedures, and small data and message transfer. The EPC subsystem may also comprise a Serving Gateway (SGW) 117, which may be responsible for the routing and forwarding of data packets. The EPC subsystem may also include a Packet data network Gateway (PGW) 119, which may be responsible for providing connectivity from the user equipment 101 to one or more PDN(s) 105. Both the SGSN 111 and the MME 115 may be in communication with a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

Figure 3:
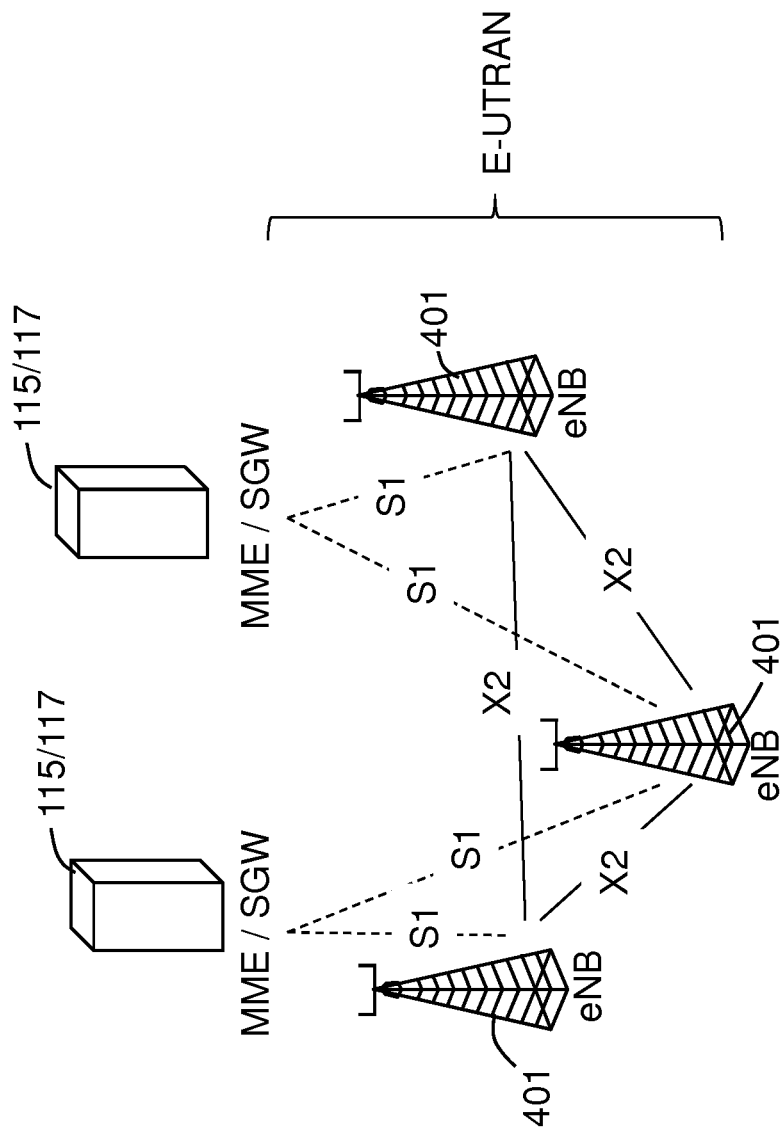
FIG. 3 is an illustrative example of E-UTRAN architecture.

The Evolved UMTS Terrestrial Radio Access Network (E-UTRAN) comprise base stations 401 called enhanced NodeBs (eNBs or eNodeBs), providing the E-UTRA user plane and control plane protocol terminations towards the user equipment. The base stations or eNBs 401 are interconnected with each other by means of the X2 interface. The eNBs 401 are also connected by means of the S1 interface to the EPC (Evolved Packet Core), more specifically to the MME (Mobility Management Entity) 115 by means of the S1-MME interface and to the Serving Gateway (SGW) 117 by means of the S1-U interface. The S1 interface supports many-to-many relation between MMEs/SGWs and eNBs. The E-UTRAN architecture is illustrated in FIG. 3.

The eNB 401 hosts functionalities such as Radio Resource Management (RRM), radio bearer control, admission control, header compression of user plane data towards serving gateway, routing of user plane data towards the serving gateway. The MME 115 is the control node that processes the signaling between the user equipment and the CN. The main functions of the MME 115 are related to connection management and bearer management, which are handled via Non Access Stratum (NAS) protocols. The SGW 117 is the anchor point for user equipment mobility, and also comprises other functionalities such as temporary DL data buffering while the user equipment 101 is being paged, packet routing and forwarding the right eNB, gathering of information for charging and lawful interception. The PDN Gateway (PGW) 119 is the node responsible for user equipment IP address allocation, as well as Quality of Service (QoS) enforcement (this is explained further in later sections).

Figure 4:
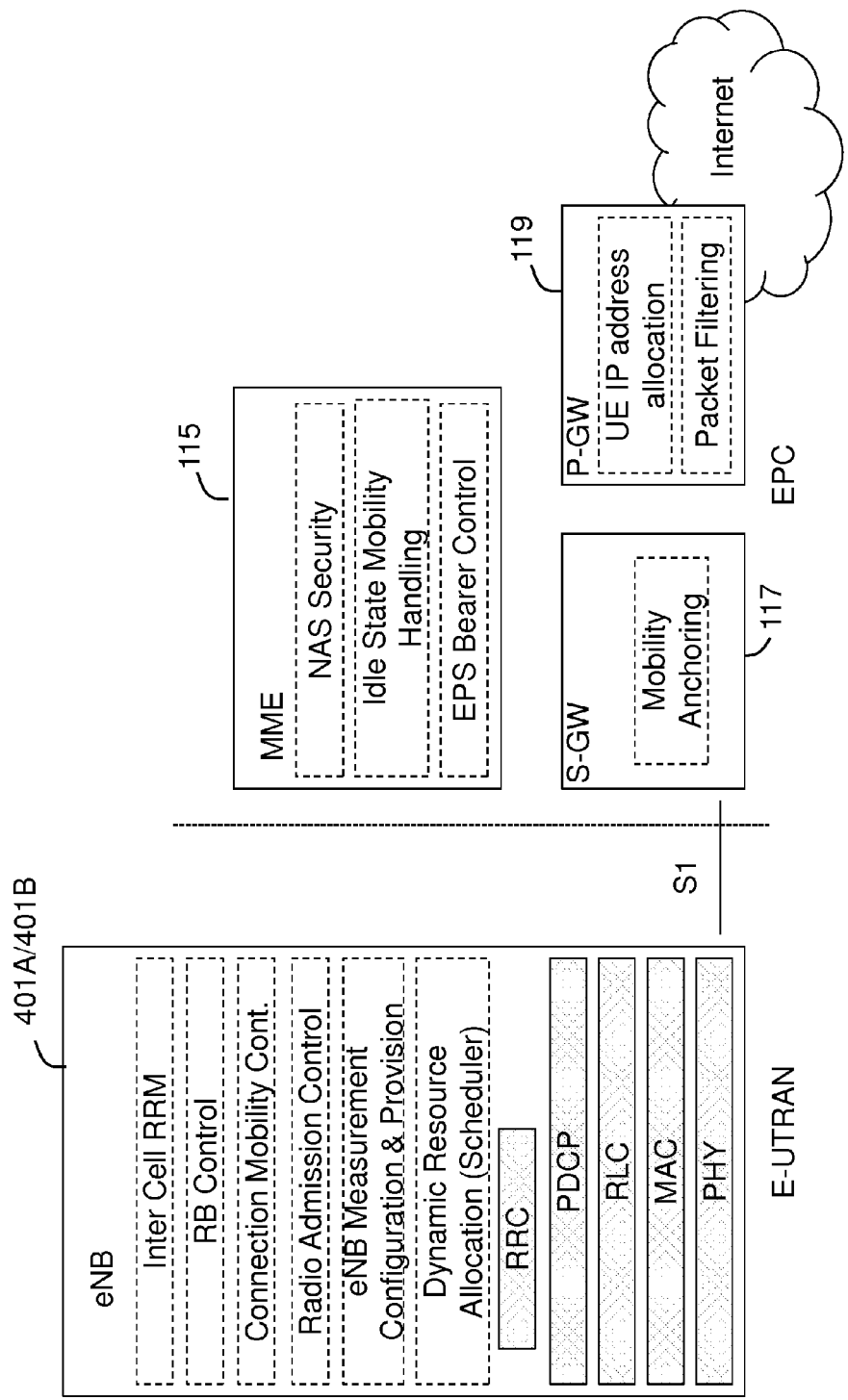
FIG. 4 is a schematic depicting the functional split between E-UTRAN and EPC.

FIG. 4 gives a summary of the functionalities of the different nodes, referred to in 3GPP TS 36.300 and the references therein providing the details of the functionalities of the different nodes. In FIG. 4, the solid lined boxes depict the logical nodes, dashed boxes depict the functional entities of the control plane and cross-hatched boxes depict the radio protocol layers.

Radio Protocol Architecture

Figure 5:
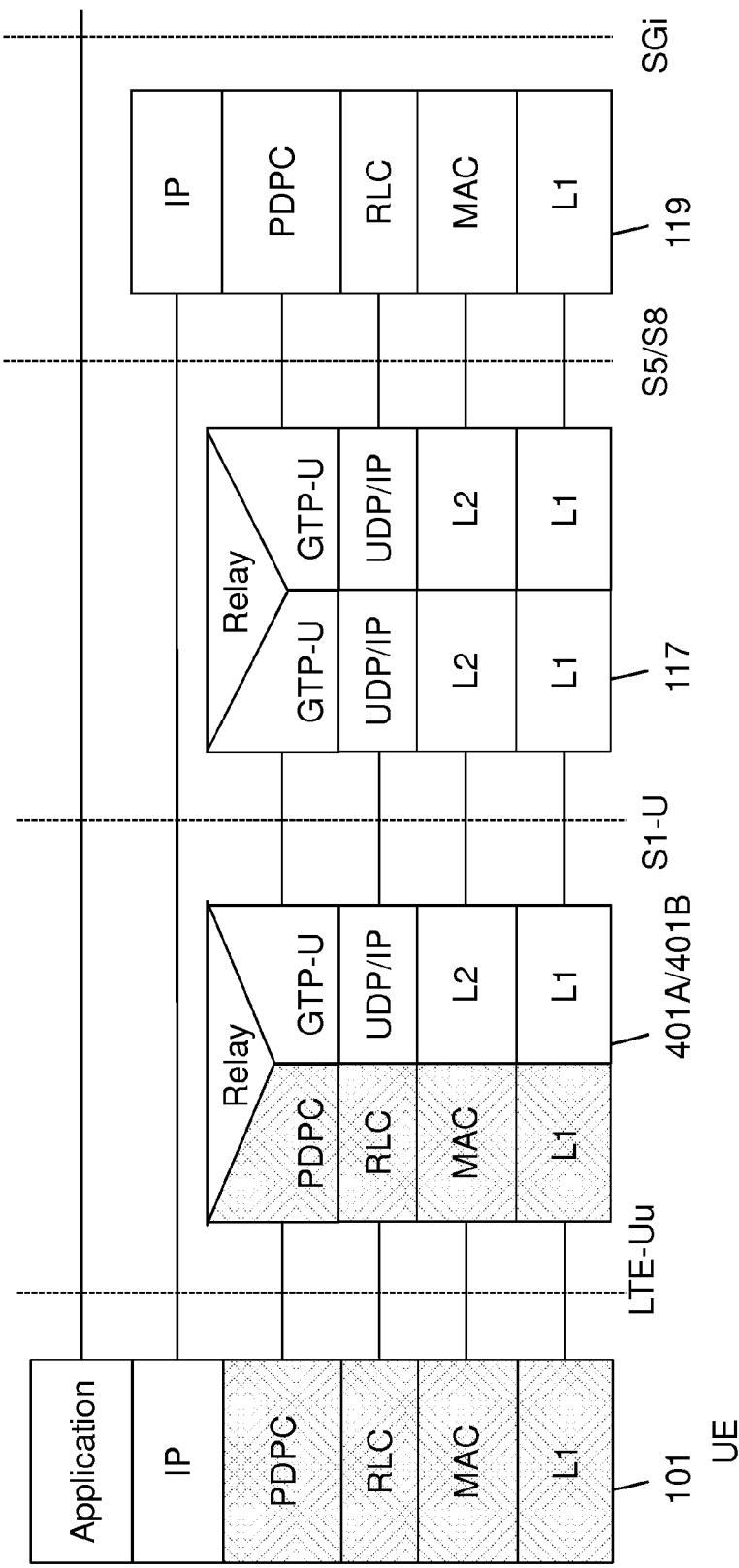
FIG. 5 is a user plane protocol stack.

The radio protocol architecture of E-UTRAN is divided into the user plane and the control plane. FIG. 5 shows the protocol stack for the user-plane. The user plane protocol stack is comprised of the Packet Data Convergence Protocol (PDCP), Radio Link Control (RLC), and Medium Access Control (MAC), which are terminated at the eNB 401. The PDCP manages IP packets in the user plane and it performs functionalities such as header compression, security, and re-ordering and retransmission during handover. The RLC layer is mainly responsible for segmentation (and corresponding assembly) of PDCP packets, in order that they fit the size that is actually to be transmitted over the air interface. RLC can operate either in unacknowledged mode or acknowledged mode, where the latter supports retransmissions. The MAC layer performs multiplexing of data from different radio bearers, and it is the one that informs the RLC about the size of the packets to provide, which is decided based on the required QoS of each radio bearer and the current capacity available to the user equipment 101.

Figure 6:
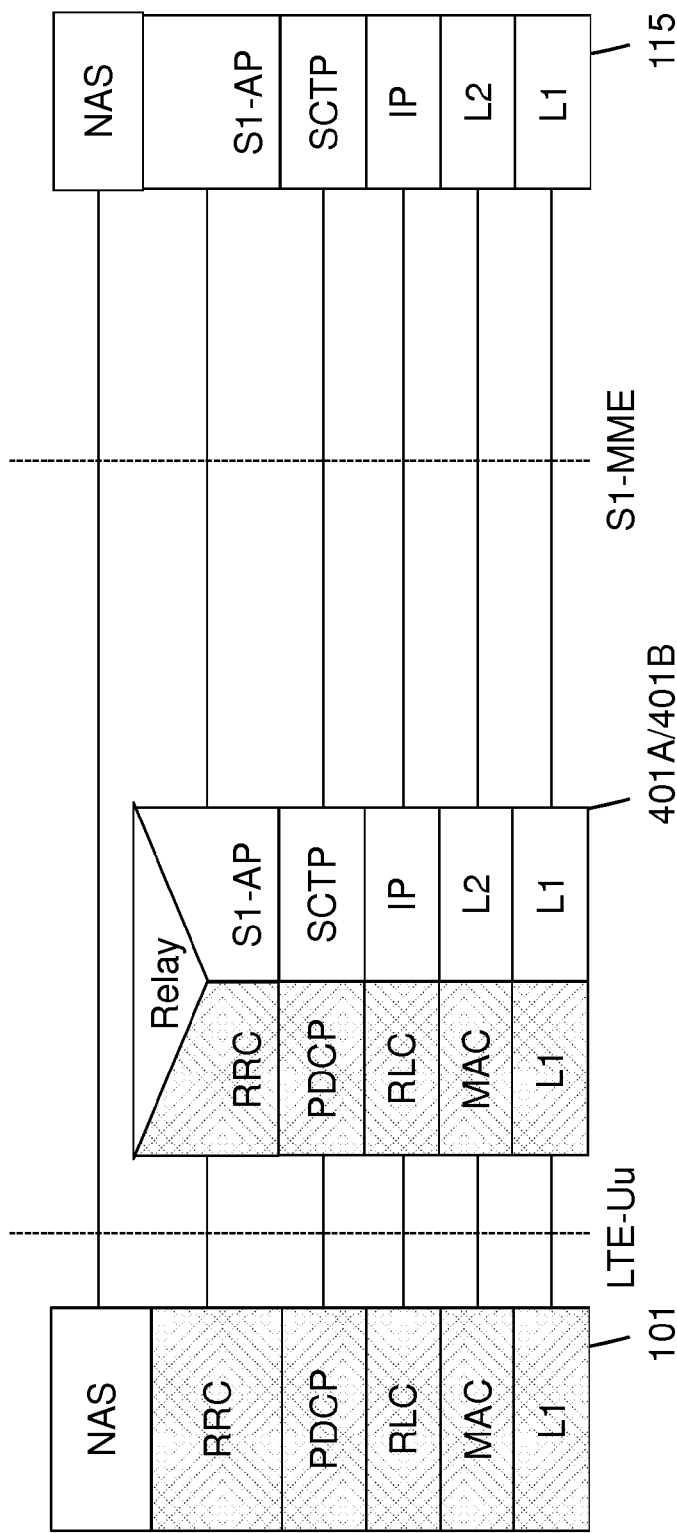
FIG. 6 is a control plane protocol stack.

FIG. 6 shows the control plane protocol stack. The layers below the Radio Resource Control (RRC) layer perform the same functionality as in the user plane except that there is no header compression in the control plane. The main functions of the RRC are the broadcasting of system information, RRC connection control (establishment, modification, and release of RRC connection, establishment of signaling radio bearers (SRB) and data radio bearers (DRBs), handover, configuration of lower protocol layers, radio link failure recovery, etc.), and measurement configuration and reporting. The details of the RRC protocol functionalities and procedures may be found in 3GPP TS 36.331.

A user equipment or wireless terminal 101 in general is uniquely identified over the S1 interface within an eNB 401 with the eNB UE S1AP ID. When an MME 115 receives an eNB UE S1AP ID it stores it for the duration of the user equipment associated logical S1-connection for this user equipment 101. Once known to an MME 115 this IE is comprised in all user equipment associated S1-AP signaling. The eNB UE S1AP ID is unique within the eNB 401, and user equipments are assigned new S1AP ID after a handover by the target eNB.

From the MME side, a user equipment 101 is uniquely identified using the MME UE S1AP ID. When an eNB 401 receives an MME UE S1AP ID it stores it for the duration of the user equipment-associated logical 51 connection for this user equipment 101. Once known to an eNB 401 this IE is comprised in all user equipment associated S1-AP signaling. The MME UE S1AP ID is unique within the MME 115, and it is changed if the user equipment's MME changes, for example, handover between two eNBs connected to different MMEs.

Figure 7:
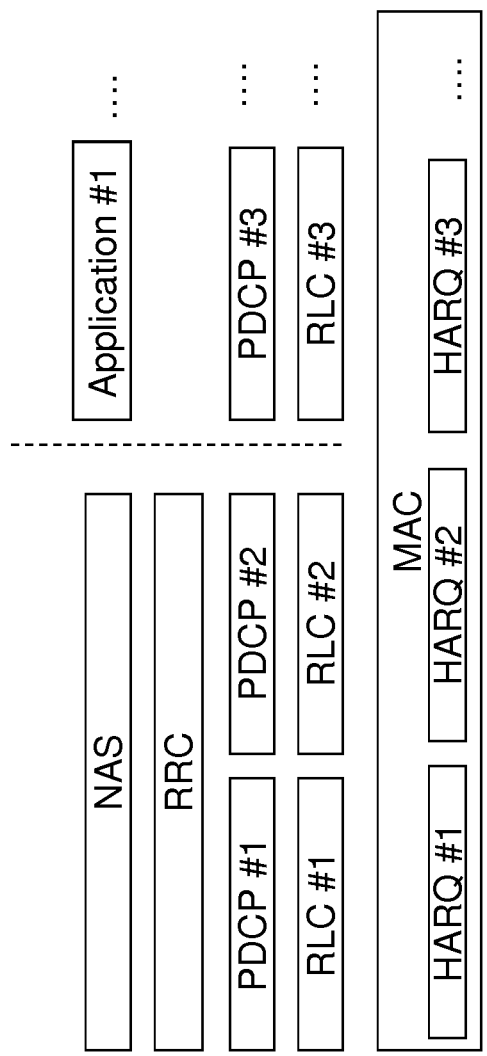
FIG. 7 is a user plane and control plane data flow.

The flow of user plane and control plane data is illustrated in FIG. 7. There is only one MAC entity per user equipment 101 (unless the user equipment supports multiple carriers as in the case of carrier aggregation) and under this MAC entity, several Hybrid ARQ (HARQ) processes might be running simultaneously for rapid retransmissions. There is a separate RLC entity for each radio bearer and if the radio bearer is configured to use PDCP, there is also one separate PDCP entity for that bearer. A bearer is configured to use PDCP only if it is dedicated to a user equipment (i.e., multicast and broadcast data do not utilize PDCP both in the control and user plane and the PDCP is used only for dedicated control message in the control plane and for dedicated UL/DL data in the user plane).

At the transmitting side each layer receives a Service Data Unit (SDU) from a higher layer, and sends a Protocol Data Unit (PDU) to the lower layer. For example, PDCP PDUs are sent towards the RLC, and they are RLC SDUs from RLC point of view, which in turn sends RLC PDUs towards the MAC, which are MAC SDUs from the MAC point of view. At the receiving end, the process is reversed, i.e. each layer passing SDUs to the layer above it, where they are perceived as PDUs.

Quality of Service

A user equipment 101 may have multiple applications running at the same time, each having different QoS requirements, for example, VoIP, browsing, file download, etc. In order to support these different requirements, different bearers are set up, each being associated with a QoS. An EPS bearer/E-RAB (Radio Access Bearer) is the level of granularity for bearer level QoS control in the EPC/E-UTRAN. That is, Service Data Flows (SDF) mapped to the same EPS bearer receive the same bearer level packet forwarding treatment (e.g., scheduling policy, queue management policy, rate shaping policy, RLC configuration, etc.).

One EPS bearer/E-RAB is established when the user equipment 101 connects to a PDN, and that remains established throughout the lifetime of the PDN connection to provide the user equipment 101 with always-on IP connectivity to that PDN. That bearer is referred to as the default bearer. Any additional EPS bearer/E-RAB that is established to the same PDN is referred to as a dedicated bearer. The initial bearer level QoS parameter values of the default bearer are assigned by the network, based on subscription data. The decision to establish or modify a dedicated bearer may only be taken by the EPC, and the bearer level QoS parameter values are always assigned by the EPC.

An EPS bearer/E-RAB is referred to as a GBR bearer if dedicated network resources related to a Guaranteed Bit Rate (GBR) value that is associated with the EPS bearer/E-RAB are permanently allocated (e.g., by an admission control function in the eNB) at bearer establishment/modification. Otherwise, an EPS bearer/E-RAB is referred to as a Non-GBR bearer. A dedicated bearer may either be a GBR or a Non-GBR bearer while a default bearer shall be a Non-GBR bearer.

Figure 8:
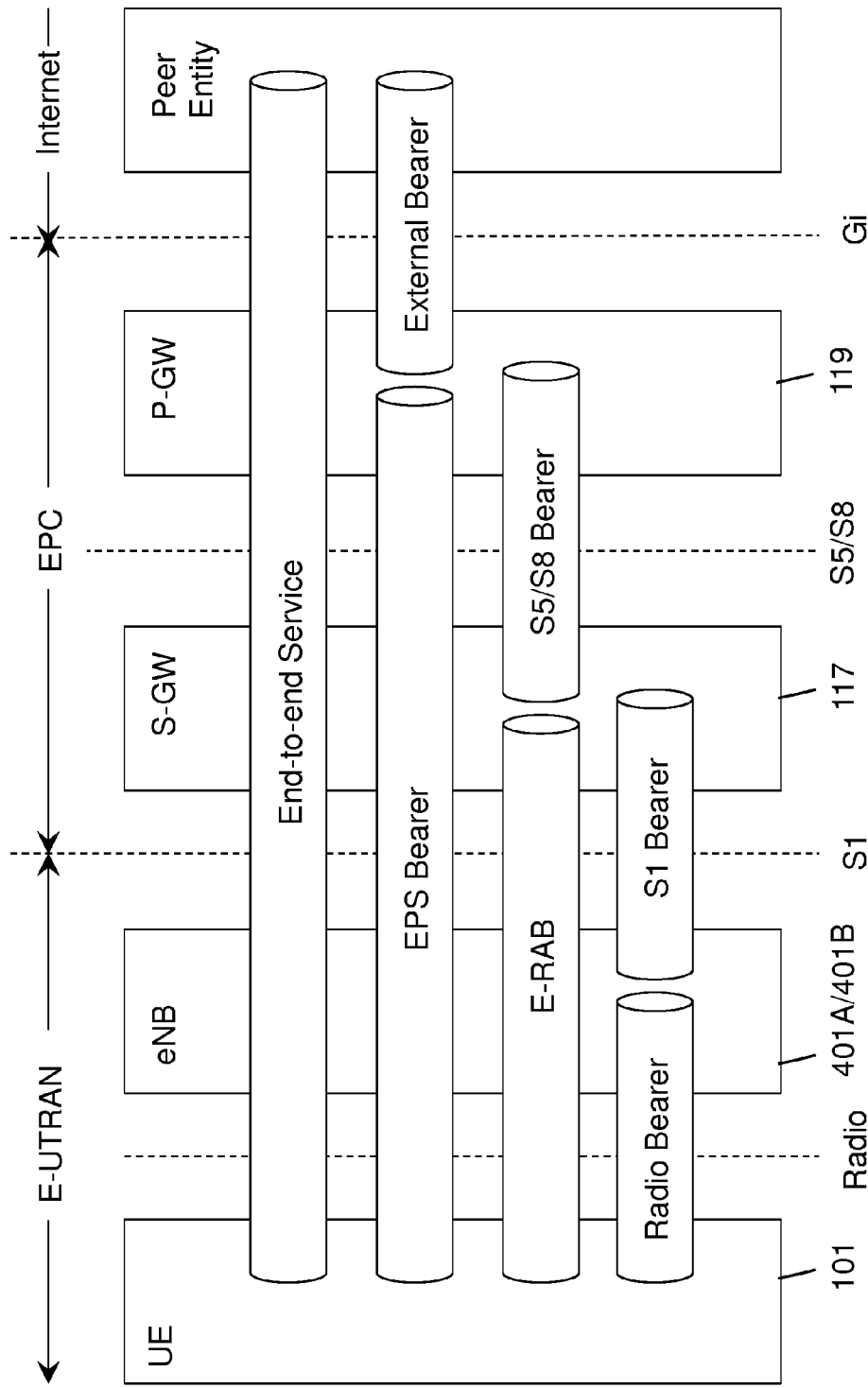
FIG. 8 is an illustrative example of bearer service architecture.

The EPS bearer service architecture is shown in FIG. 8. The packets of an EPS bearer are transported over a radio bearer between the user equipment 101 and eNB 401. An S1 bearer transports the packets of an EPS bearer between the eNB 401 and SGW 117. An E-RAB is actually a concatenation of these two bearers (i.e., radio bearer and S1 bearer), and the two bearers are mapped on a one to one fashion. An S5/S8 bearer transports the packets of the EPS bearer between the SGW 117 and PGW 119, and completes the EPS bearer. Here also there is a one to one mapping between the E-RAB and S5/S8 bearer.

The bearer level (i.e., per bearer or per bearer aggregate) QoS parameters are QCI, ARP, GBR, and AMBR. Each EPS bearer/E-RAB (GBR and Non-GBR) is associated with the following bearer level QoS parameters: QCI and ARP. QoS Class Identifier (QCI) is a scalar that is used as a reference to access node-specific parameters that control bearer level packet forwarding treatment (e.g., scheduling weights, admission thresholds, queue management thresholds, link layer protocol configuration, etc.), and that has been pre-configured by the operator owning the eNodeB 401. The QCI may also be used to reference node-specific parameters that control bearer level packet forwarding treatment in the other nodes in the user plain chain, for example, the PGW 119 and the SGW 117. Nine QCI values are standardized, the detailed requirements of these classes may be found in 3GPP TS 23.203. Allocation and Retention Priority (ARP) is used to decide whether a bearer establishment/modification request may be accepted or needs to be rejected in case of resource limitations. In addition, the ARP may be used by the eNodeB 401, SGW 117 or PGW 119 to decide which bearer(s) to drop during exceptional resource limitations (e.g., at handover).

Each GBR bearer is additionally associated with the bearer level QoS parameters GBR and MBR. Guaranteed Bit Rate (GBR) is the bit rate that may be expected to be provided by a GBR bearer. Maximum Bit Rate (MBR) is the maximum bit rate that may be expected to be provided by a GBR bearer. MBR can be greater or equal to the GBR.

Each APN access, by a user equipment 101, is associated with a per-APN Aggregate Maximum Bit Rate (APN-AMBR). The APN-AMBR sets the limit on the aggregate bit rate that may be expected to be provided across all Non GBR bearers and across all PDN connections of the same APN. Each user equipment 101 in state EMM-REGISTERED is associated with the bearer aggregate level QoS parameter known as per user equipment Aggregate Maximum Bit Rate (UE-AMBR). The UE AMBR limits the aggregate bit rate that may be expected to be provided across all Non GBR bearers of a user equipment 101.

Heterogeneous Networks and Soft/Shared Cells

Figure 9:
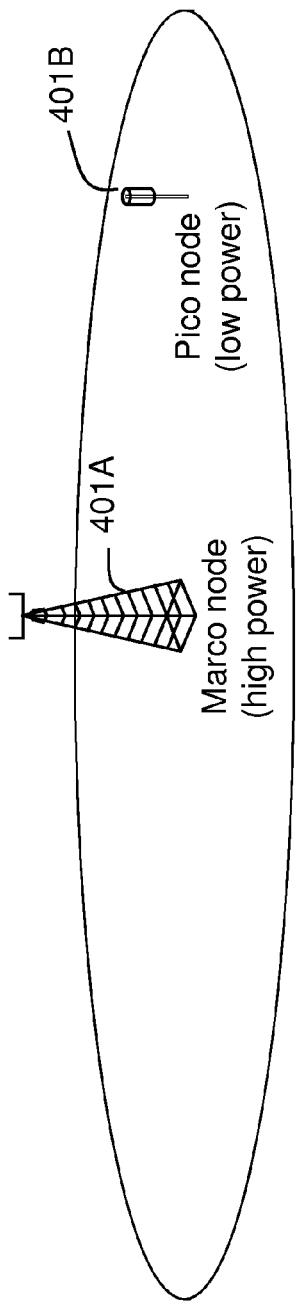
FIG. 9 is an illustrative example of a heterogeneous deployment with a higher-power macro node and a lower-power pico node.

The use of a so called heterogeneous deployment or heterogeneous network, as illustrated in FIG. 9, comprising network transmission nodes with different transmit power operating and with overlapping coverage areas, is considered to be an interesting deployment strategy for cellular networks. In such a deployment, the low-power nodes ("pico nodes"), which may be utilized as assisting base stations 401B, are typically assumed to offer high data rates (Mbit/s), as well as provide high capacity (users/m2 or Mbit/s/m2), in the local areas where this is needed/desired, while the high-power nodes ("macro nodes"), which may be utilized as anchor base stations 401A, are assumed to provide full-area coverage. In practice, the macro nodes 401A may correspond to currently deployed macro cells while the pico nodes 401B are later deployed nodes, extending the capacity and/or achievable data rates within the macro-cell coverage area where needed.

Figure 10:
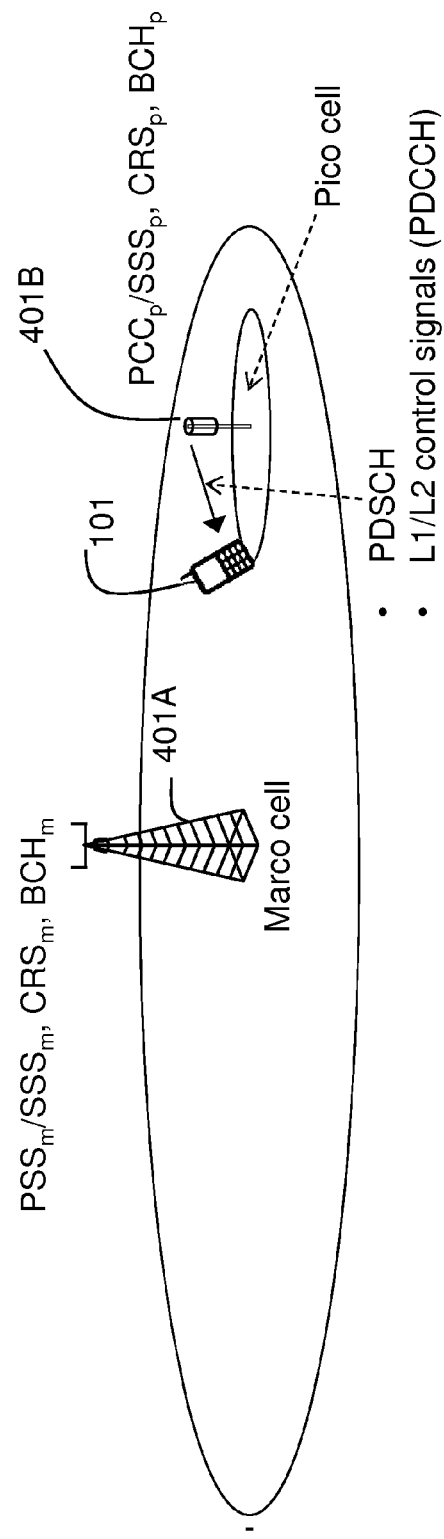
FIG. 10 is an illustrative example of a heterogeneous deployment where the pico node corresponds to a cell of its own.

A pico node 401B of a heterogeneous deployment may correspond to a cell of its own (a "pico cell"), as illustrated in FIG. 10. This means that, in addition to downlink and uplink data transmission/reception, the pico node also transmits the full set of common signals/channels associated with a cell. In the LTE context this comprises Primary and Secondary Synchronization Signals (PSS and SSS) corresponding to the Physical Cell Identity of the pico cell. Also comprised are Cell-specific reference signals (CRS), also corresponding to the Physical Cell Identity of the cell. The CRS may, for example, be used for downlink channel estimation to enable coherent demodulation of downlink transmissions. Further comprised is the Broadcast channel (BCH), with corresponding pico-cell system information.

As the pico node 401B transmits the common signals/channels, the corresponding pico cell may be detected and selected (e.g., connected to) by a terminal (UE, user equipment) 101. If the pico node 401B corresponds to a cell of its own, also so-called L1/L2 control signaling on the PDCCH (as well as PCFICH and PHICH) are transmitted from the pico node to connected terminals, in addition to downlink data transmission on the PDSCH. The L1/L2 control signaling, for example, provides downlink and uplink scheduling information and Hybrid-ARQ-related information to terminals within the cell. This is shown in FIG. 10.

Figure 11:
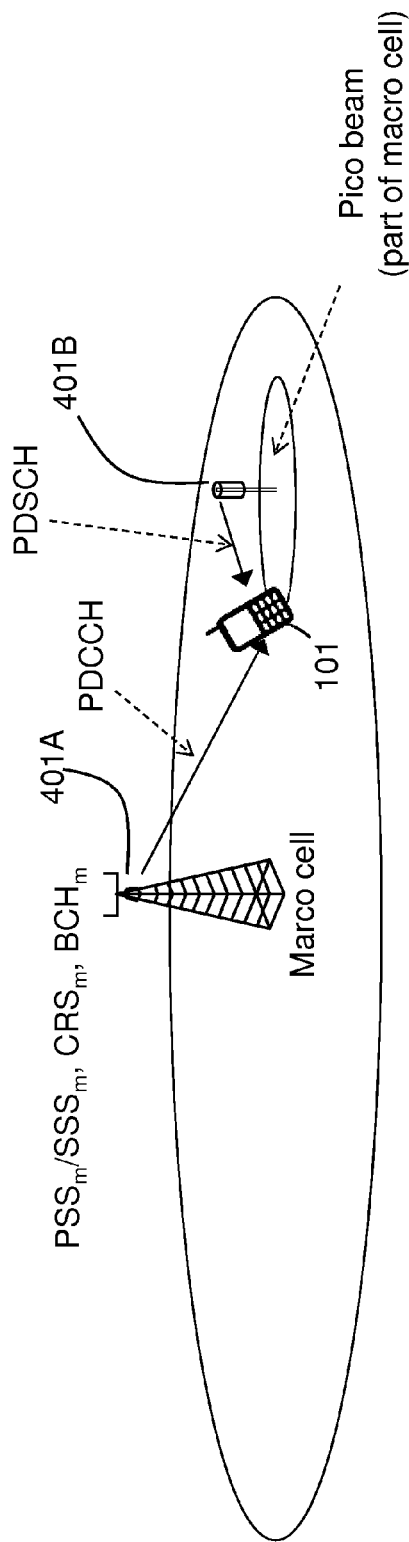
FIG. 11 is an illustrative example of a heterogeneous deployment where the pico node does not correspond to a cell of its own.

Alternatively, a pico node 401B within a heterogeneous deployment may not correspond to a cell of its own but may just provide a data-rate and capacity "extension" of the overlaid macro cell 401A. This is sometimes known as "shared cell" or "soft cell". In this case at least the CRS, PBCH, PSS and SSS are transmitted from the macro node 401A. The PDSCH may be transmitted from the pico node 401B. To allow for demodulation and detection of the PDSCH, despite the fact that no CRS is transmitted from the pico node 401B, DM-RS should be transmitted from the pico node 401B together with the PDSCH. The user equipment-specific reference signals may then be used by the terminal for PDSCH demodulation/detection. This is shown in FIG. 11.

Figure 12:
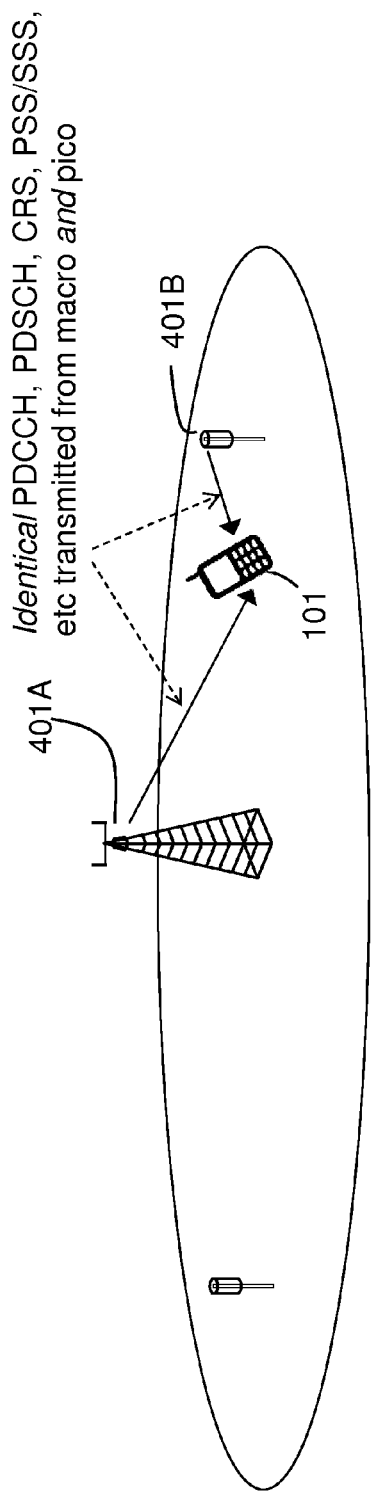
FIG. 12 is a depiction of SFN operation with identical transmission from macro and pico to a terminal.

Transmitting data from a pico node 401B not transmitting CRS as described above requires DM-RS support in the terminal ("non-legacy terminal"). In LTE, DM-RS-based PDSCH reception is supported in Rel-10 and for FDD while for the L1/L2 control signaling, DM-RS-based reception is planned for Rel-11. For terminals not supporting DM-RS-based reception ("legacy terminals") one possibility in a shared cell setting is to exploit $SFN^2$-type of transmission. In essence identical copies of the signals and channels necessary for a legacy terminal are transmitted simultaneously from the macro 401A and pico 401B nodes. From a terminal perspective this will look as a single transmission. Such an operation, which is illustrated in FIG. 12, will only provide an SINR gain. This may be translated into a higher data rate, but not a capacity improvement, as transmission resources cannot be reused across sites within the same cell.

Figure 13:
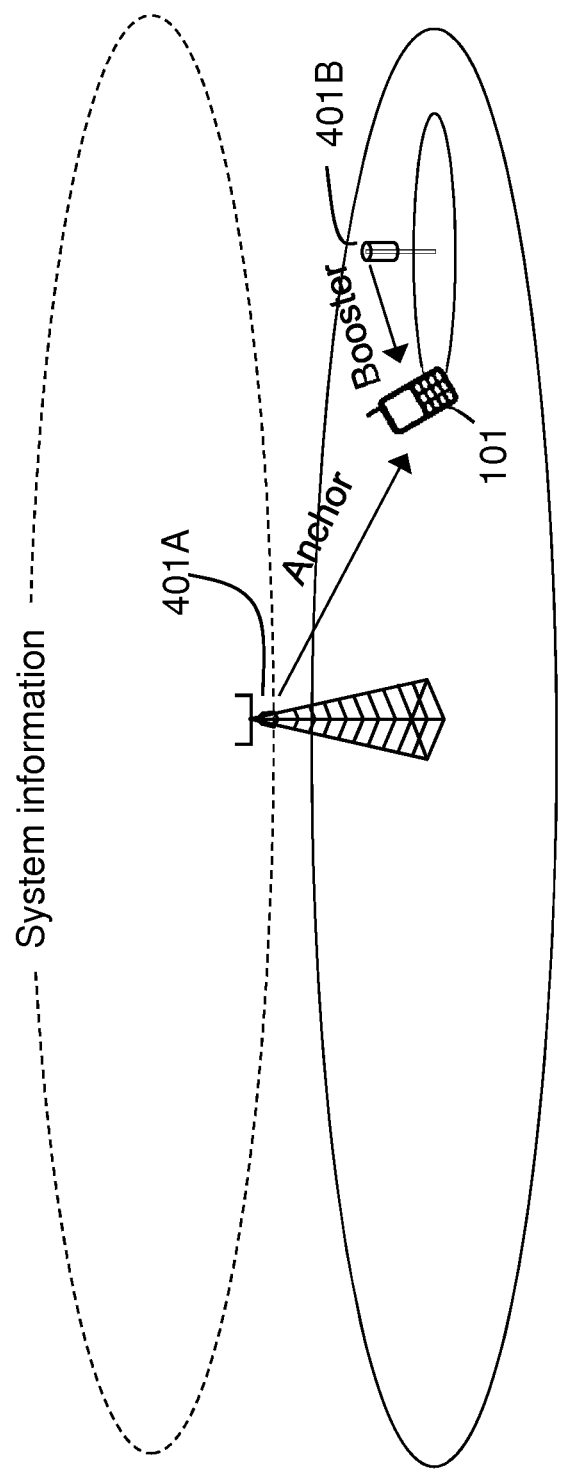
FIG. 13 is a depiction of soft cell operation with the wireless terminal having multiple connections with both the anchor and assisting base stations.

It may be assumed that the macros 401A are able to provide coverage and the picos 401B are there only for capacity enhancements (i.e., no coverage holes), another alternative architecture is where the user equipment maintains the macro connectivity all the time (called the "anchor" flow), and adds the pico connectivity when it is in the coverage area of the pico (called the "assisting" flow). When both connections are active, the anchor flow may be used either for control signaling while the assisting flow is used for data. However, it will still be possible to send data also via the anchor flow. We define this case as "multiple connectivity" or "dual connectivity". This is illustrated in FIG. 13. Note that in this case, as in the previous cases, the system information is shown to be sent only from the macro 401A, but it is still possible to send it also from the picos 401B.

Protocol Architecture for Soft Cells

Figure 14:
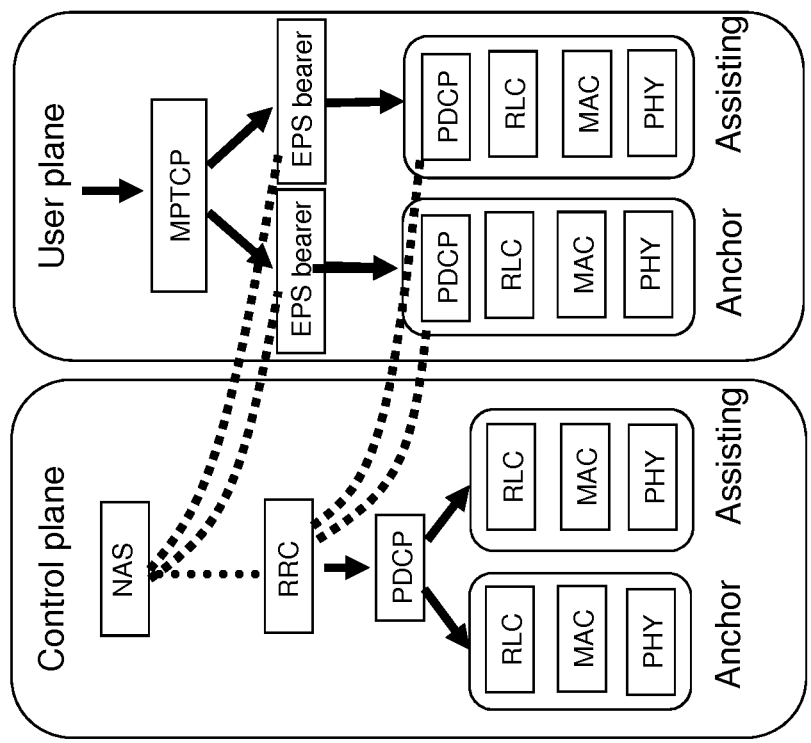
FIG. 14 is an illustrative example of protocol architecture for multiple or dual connectivity.

In order to support multiple connectivity, several architectural options are possible both for the control and user plane. For the user plane, we can have a centralized approach where the PDCP (or even the RLC) is terminated at the anchor only and the assisting node terminates at the RLC (or even the MAC) level. A decentralized approach will be to have the assisting node to terminate at the PDCP level. A similar approach may be taken in the control plane, for example, distributed or centralized PDCP/RLC, but on top of that we have the additional dimension of centralizing or distributing the RRC. FIG. 14 shows example control and user plane architectures, where the user plane is employing distributed PDCP, while the control plane is centralized at the PDCP level at the anchor. Note that in the figure, user plane aggregation, for example, the possibility to split the packets belonging to one application data flow over the anchor and assisting links, may be realized by using a higher layer aggregation protocol like multi-path TCP (MTCP).

User Equipment Measurements

User equipments may be configured to report measurements, mainly for the sake of supporting mobility. As specified in 3GPP TS 36.331, the E-UTRAN provides the measurement configuration applicable for a user equipment in RRC_CONNECTED by means of dedicated signaling, for example, using the RRCConnectionReconfiguration message.

Various measurement configurations may be signaled to the user equipment. An example of such a measurement configuration is measurement objects. Measurement objects define on what the user equipment should perform the measurements on, for example, a carrier frequency. The measurement object may also comprise a list of cells to be considered (white-list or black-list) as well as associated parameters, for example, frequency- or cell-specific offsets.

Another example of a measurement configuration is a reporting configuration. Reporting configurations comprise periodic or event-triggered criteria which cause the user equipment to send a measurement report, as well as the details of what information the user equipment is expected to report. The information to be reported may comprise quantities such as, for example, Received Signal Code Power (RSCP) for UMTS or Reference Signal Received Power (RSRP) for LTE, and the number of cells.

Another example configuration may be measurement identities. Measurement identities identify a measurement and define the applicable measurement object and reporting configuration. Each measurement identity links one measurement object with one reporting configuration. By configuring multiple measurement identities it is possible to link more than one measurement object to the same reporting configuration, as well as to link more than one reporting configuration to the same measurement object. The measurement identity is used as a reference number in the measurement report.

A further configuration example is quantity configurations. Quantity configurations define the filtering to be used on each measurement. One quantity configuration is configured per RAT type, and one filter can be configured per measurement quantity.

Yet another example configuration is measurement gaps. Measurement gaps define time periods when no uplink or downlink transmissions will be scheduled, so that the user equipment may perform the measurements, for example, inter-frequency measurements where the user equipment has only one Tx/Rx unit and supports only one frequency at a time. The measurement gaps configuration are common for all gap-assisted measurements.

The E-UTRAN configures only a single measurement object for a given frequency, but more than one measurement identity may use the same measurement object. The identifiers used for the measurement object and reporting configuration are unique across all measurement types. It is possible to configure the quantity which triggers the report (RSCP or RSRP) for each reporting configuration.

In LTE, some examples of measurement metrics used are the Reference Signal Received Power (RSRP) and Reference Signal Received Quality (RSRQ). RSRP is a cell specific measure of signal strength and it is mainly used for ranking different cells for handover and cell reselection purposes, and it is calculated as the linear average of the power of the Resource Elements (REs) which carry cell-specific Reference Signals (RSs). The RSRQ, on the other hand, also takes the interference into consideration by taking the total received wideband power into account as well.

One of the measurement configuration parameters that user equipments receive from their serving eNBs is the S-measure. The S-measure tells the user equipment when to start measuring neighboring cells. If the measured RSRP of the serving cell falls below the S-measure, indicating the signal of the serving cell is not that strong anymore, the user equipment starts measuring the signal strength of RSs from the neighboring cells. The S-measure is an optional parameter and different S-measure values may be specified for initiating intra-frequency, inter-frequency and inter-RAT measurements. Once the user equipment is enabled for measuring, it may report the serving cell, listed cells (i.e. cells indicated as part of the measurement object), and/or detected cells on a listed frequency (i.e. cells which are not listed cells but are detected by the user equipment).

There are several measurement configuration parameters that specify the triggering of measurement reports from the user equipment. An example of event-triggered criteria, which is specified for intra-RAT measurement reporting in LTE, is Event A1. Event A1 triggers when the Primary serving cell, PCell becomes better than an absolute threshold. Another example is Event A2, which triggers when the PCell becomes worse than the absolute threshold. A further example is Event A3, which triggers when the neighbor cell becomes better than an offset relative to the PCell. A further example is Event A4, which triggers when the neighbor cell becomes better than the absolute threshold. Yet another example is Event A5, which triggers when the PCell becomes worse than one absolute threshold and the neighbor cell becomes better than another absolute threshold. Another example is Event A6, which triggers when the neighbor cell becomes better than an offset relative to a secondary cell (SCell).

Various event-triggered reporting criteria are specified for inter-RAT mobility. An example is Event B1, which triggers when the neighbor cell becomes better than an absolute threshold. A further example is Event B2, which triggers when the serving cell becomes worse than one absolute threshold and a neighbor cell becomes better than another absolute threshold.

Figure 15:
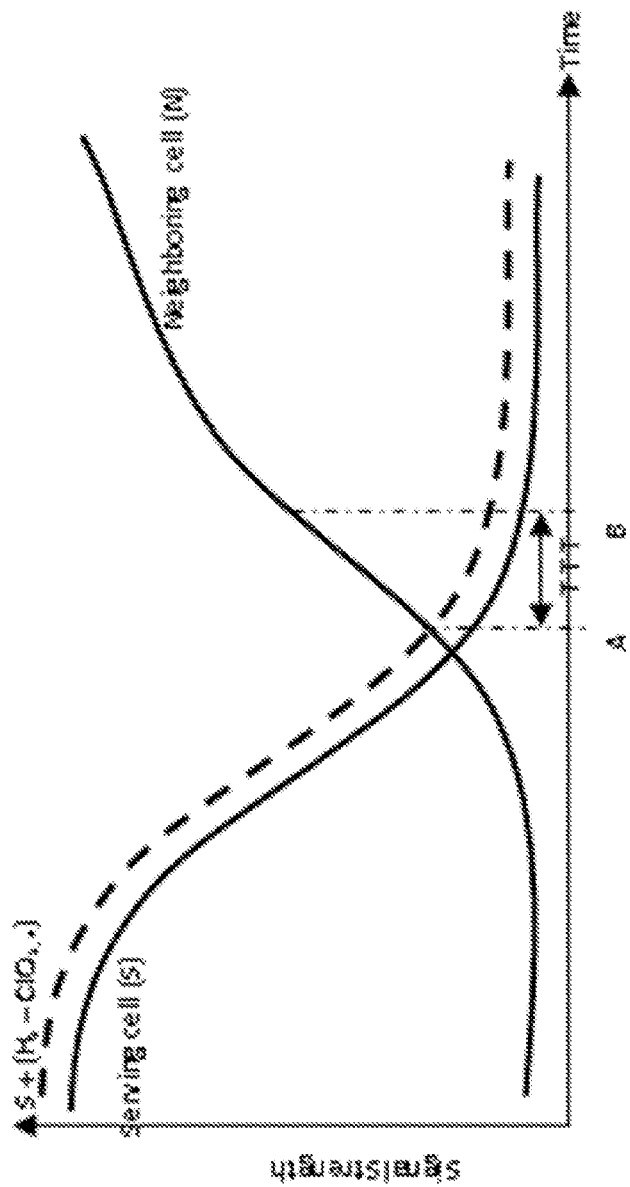
FIG. 15 is an illustrative example of handover triggering.

An example of a measurement report triggering event related to handover is A3, and its usage is illustrated in FIG. 15. The triggering conditions for event A3 can be formulated as:

$$N > S + HOM \quad (1)$$

where N and S are the signal strengths of the neighbor and serving cells, respectively, and HOM is the handover margin. HOM is the difference between the radio quality of the serving cell and the radio quality needed before attempting a handover. The radio quality is measured either using RSRP or RSRQ (see 3GPP TS 36.133 for further explanation).

The user equipment triggers the intra-frequency handover procedure by sending Event A3 report to the eNB. This event occurs when the user equipment measures that the target cell is better than the serving cell with a margin "HOM". The user equipment is configured over RRC when entering a cell and the HOM is calculated from the following configurable parameters:

$$HOM = Ofs + Ocs + Off - Ofn - Ocn + Hys \quad (2)$$

where Ofs is the frequency specific offset of the serving cell, Ocs is the cell specific offset (CIO) of the serving cell, Off is the a3-Offset, Of n is the frequency specific offset of the neighbor cell, Ocn is the CIO of the neighbor cell and Hys is the hysteresis.

If the condition in (1) is satisfied and it remains valid for a certain duration known as Time To Trigger (TTT), the user equipment sends a measurement report to the serving eNB (in FIG. 15, event A3 is satisfied at point A and measurement report is sent at point B in time). When the serving eNB gets the measurement report, it may initiate a handover towards the neighbor.

In addition to event-triggered reporting, the user equipment may be configured to perform periodic measurement reporting. In this case, the same parameters may be configured as for event-triggered reporting, except that the user equipment starts reporting immediately rather than only after the occurrence of an event.

Handover

Handover is one of the important aspects of any mobile communication system, where the system provides service continuity of the user equipment by transferring the connection from one cell to another depending on several factors such as signal strength, load conditions, service requirements, etc. The provision of efficient/effective handovers (minimum number of unnecessary handovers, minimum number of handover failures, minimum handover delay, etc.), would affect not only the Quality of Service (QoS) of the end user but also the overall mobile network capacity and performance.

In LTE, UE-assisted, network controlled handover is utilized (3GPP TS 36.300). The handover is based on user equipment reports, and the user equipment 101 is moved, if required and possible, to the most appropriate cell that will assure service continuity and quality.

Figure 16:
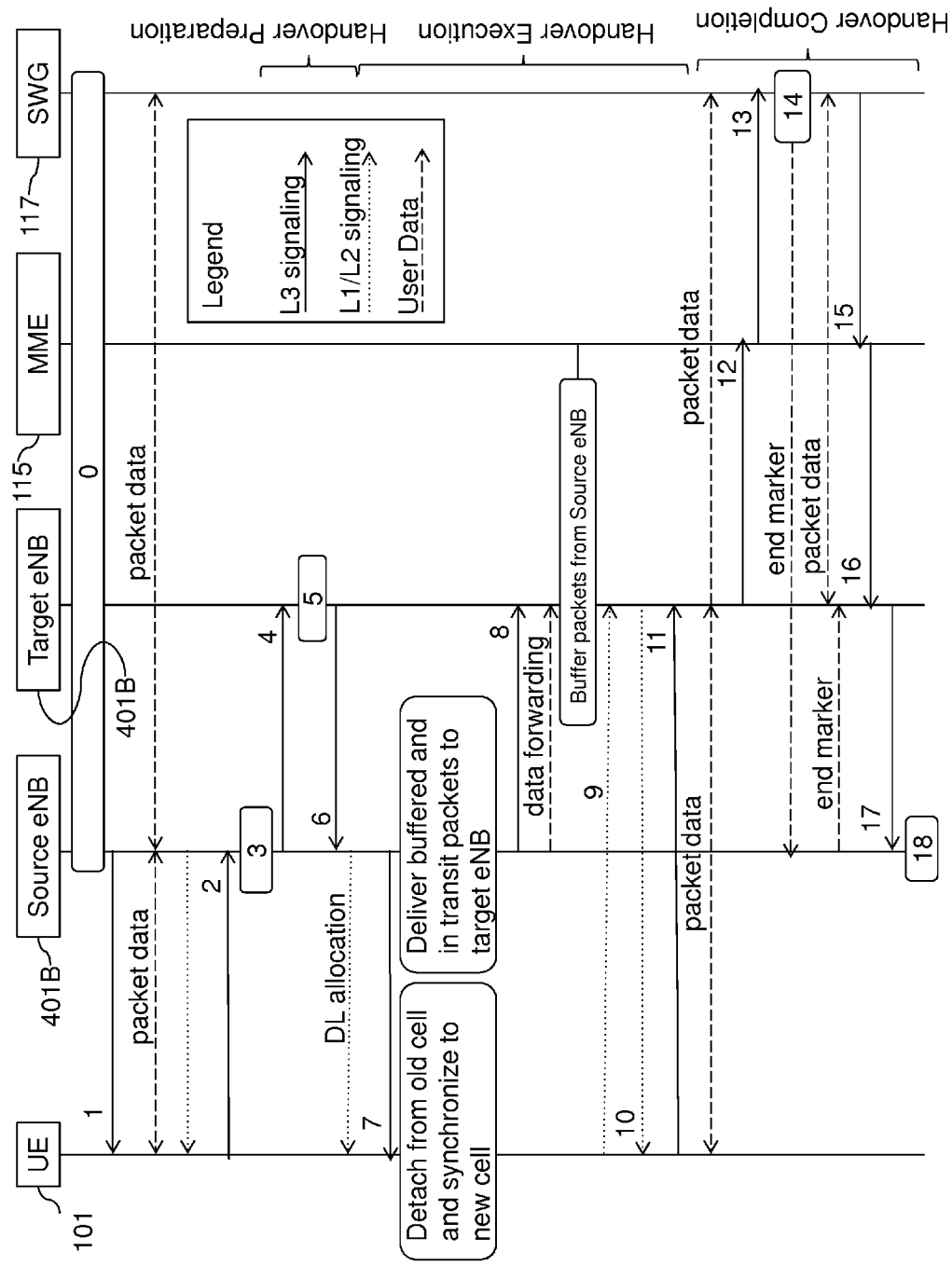
FIG. 16 is a messaging diagram illustrating an example of an X2 handover in LTE.

Handover is performed via the X2 connection, whenever available, and if not, using 51 (i.e., involving the Core Network (CN)). The X2 Handover process is shown in FIG. 16. The handover procedure can be sub-divided into three stages of preparation (initiation), execution and completion.

The main steps of the handover process are described below:

1. The source eNB configures the user equipment measurement procedures. This may be done either when the user equipment first connects to an eNB (comprised in the HO command as described later) or later one by sending measurement reconfigurations. The measurement configurations are sent to the user equipment by using the measConfig Information Element (IE) that is comprised in the RRCConnectionReconfiguration message.
2. The user equipment is triggered to send a measurement report by the measurement rules set as described in the previous section.
3. Based on the received measurement report and other RRM information, the source eNB makes a decision to hand over the user equipment to the target.
4. The source eNB issues a HANDOVER REQUEST message to the target eNB passing necessary information to prepare the HO at the target side. The source eNB must indicate the cause of the HO in this message. The cause of the HO may be related to radio reasons, resource optimization and/or reducing a load in the serving cell.
5. Admission Control may be performed by the target eNB.
6. The target eNB prepares HO with L1/L2 and sends the HANDOVER REQUEST ACKNOWLEDGE to the source eNB. The HANDOVER REQUEST ACKNOWLEDGE message comprises an Information Element (IE) called "Target eNB to Source eNB Transparent Container". This IE basically comprises the handover command message (RRCConnectionReconfiguration that comprises the mobilityControlInfo IE) that is sent to the user equipment in the next step.
   It should be appreciated that as soon as the source eNB receives the HANDOVER REQUEST ACKNOWLEDGE, or as soon as the transmission of the handover command is initiated in the downlink, user plane data forwarding may be initiated.
7. The source eNB sends the handover command, for example, the RRCConnectionReconfiguration message comprising the mobilityControlInfo, towards the user equipment on behalf of the target eNB.
8. The source eNB sends the SN (Sequence Number) STATUS TRANSFER message to the target eNB, which comprises the ID of the impacted E-RABs and PDCP SNs for UL and DL data transfer.
9. After receiving the RRCConnectionReconfiguration message comprising the mobilityControlInfo, the user equipment performs synchronisation with the target eNB and accesses the target cell via RACH. If the RRCConnectionReconfiguration comprised dedicated RACH information is received, the dedicated preamble comprised in there is used for the RACH access. Otherwise, a contention based approach is taken. The user equipment also configures the lower layer protocol stacks based on the received configuration information.
10. The target eNB responds with UL allocation and timing advance.
11. When the user equipment has successfully accessed the target cell, the user equipment sends the RRCConnectionReconfigurationComplete message to the target to confirm that the handover succeeded. Optionally, the user equipment may indicate to the target if it has information regarding earlier a Radio Link Failure (RLF) or other logged measurements that could be used for optimization purposes. After the confirmation is received, the target eNB may begin sending data to the user equipment and the user equipment send data to the target based on the scheduling grants it is receiving. However, the data from the CN is still routed to the source eNB.

12. The target eNB sends a PATH SWITCH REQUEST message to MME, or any other mobility management node (e.g., SGSN or S4-SGSN), to inform that the user equipment has changed the cell. Table 1 shows the contents of the PATH SWITCH REQUEST message. If not all the user equipment's bearers are comprised in the E-RAB To Be Switched in Downlink List, the MME considers the non-comprised E-RABs as implicitly released by the eNB (TS 36.413). That is, normal operation will be for the target eNB to list only those bearers that it has admitted during admission control and that it has communicated earlier to the source via the HANDOVER REQUEST ACKNOWLEDGE message. The MME releases the non-accepted dedicated bearers by triggering bearer release procedures (3GPP TS 23.401).

13. The MME sends a MODIFY BEARER REQUEST message to the Serving Gateway. The MME provides the bearers to be switched to the new target in the "Bearer contexts to be modified" field and the ones not received in the PATH SWITCH REQUEST message in the "Bearer context to be removed" field of the MODIFY BEARER REQUEST message (3GPP TS 29.274).

14. The Serving Gateway switches the downlink data path to the target side. That is, it starts sending downlink packets to the target eNodeB using the newly received address and TEIDs (3GPP TS 23.401). The Serving gateway sends one or more "end marker" packets on the old path to the source eNB and then may release any U-plane/TNL resources towards the source eNB.

15. The Serving Gateway sends a MODIFY BEARER RESPONSE message to MME.

16. The MME confirms the PATH SWITCH REQUEST message with the PATH SWITCH REQUEST ACKNOWLEDGE message. Table 2 shows the contents of this message.

TABLE 1

PATH SWITCH REQUEST message

| IE/Group Name | Presence | Range | IE type and reference | Semantics description | Criticality | Assigned Criticality |
| --- | --- | --- | --- | --- | --- | --- |
| Message Type | M | | 9.2.1.1 | | YES | reject |
| eNB UE S1AP ID | M | | 9.2.3.4 | | YES | reject |
| E-RAB To Be Switched in Downlink List | | 1 | | | YES | reject |
| >E-RABs Switched in Downlink Item IEs | | 1 to <maxnoof E-RABs> | | | EACH | reject |
| >>E-RAB ID | M | | 9.2.1.2 | | — | |
| >>Transport layer address | M | | 9.2.2.1 | | — | |
| >>GTP-TEID | M | | 9.2.2.2 | To deliver DL PDUs | — | |
| Source MME UE S1AP ID | M | | 9.2.3.3 | | YES | reject |
| E-UTRAN CGI | M | | 9.2.1.38 | | YES | ignore |
| TAI | M | | 9.2.3.16 | | YES | ignore |
| UE Security Capabilities | M | | 9.2.1.40 | | YES | ignore |
| CSG Id | O | | 9.2.1.62 | | YES | ignore |
| Cell Access Mode | O | | 9.2.1.74 | | YES | ignore |
| Source MME GUMMEI | O | | 9.2.3.9 | | YES | ignore |

TABLE 2

| IE/Group Name | Presence | Range | IE type and reference | Semantics description | Criticality | Assigned Criticality |
|---|---|---|---|---|---|---|
| PATH SWITCH REQUEST ACKNOWLEGE message | | | | | | |
| Message Type | M | | 9.2.1.1 | | YES | reject |
| MME UE S1AP ID | M | | 9.2.3.3 | | YES | ignore |
| eNB UE S1AP ID | M | | 9.2.3.4 | | YES | ignore |
| UE Aggregate Maximum Bit Rate | O | | 9.2.1.20 | | YES | ignore |
| E-RAB To Be Switched in Uplink List | | 0 . . . 1 | | | YES | ignore |
| >E-RABs Switched in Uplink Item IEs | | 1 to <maxnoof E-RABs> | | | EACH | ignore |
| >>E-RAB ID | M | | 9.2.1.2 | | — | |
| >>Transport Layer Address | M | | 9.2.2.1 | | — | |
| >>GTP-TEID | M | | 9.2.2.2 | | — | |
| E-RAB To Be Released List | O | | E-RAB List 9.2.1.36 | a value for E-RAB ID shall only be present once in E-RAB To Be Switched in Uplink List IE + E-RAB to Be Released List IE | YES | ignore |
| Security Context | M | | 9.2.1.26 | One pair of {NCC, NH} is provided | YES | reject |
| Criticality Diagnostics | O | | 9.2.1.21 | | YES | ignore |
| MME UE S1AP ID 2 | O | | 9.2.3.3 | This IE indicates the MME UE S1AP ID assigned by the MME | YES | ignore |

17. By sending the user equipment CONTEXT RELEASE message, the target eNB informs success of HO to source eNB and triggers the release of resources by the source eNB.

18. Upon reception of the UE CONTEXT RELEASE message, the source eNB may release radio and C-plane related resources associated to the user equipment context. Any on-going data forwarding may continue.

OVERVIEW OF THE EXAMPLE EMBODIMENTS

LTE currently supports only one to one connections between user equipments and eNBs. As such, when a handover is initiated, the target is asked to admit all the bearers of the user equipment. If for some reason, such as an overload situation, some of the bearers may not be admitted at the target, the source may either cancel the handover (and possibly try another candidate target) or accept it and handover the user equipment to the target, which will result in the dropping of the non-admitted bearers. This may have severe consequences on the overall experience of the user.

Current specifications do not allow the setup of bearers in parallel and in multiple eNBs for the same user equipment, which is needed for enabling multiple connectivity. This would allow an optimal distribution of bearers depending on their QoS and UL/DL requirements. Some of the example embodiments address the required changed in the communication between the eNBs and the CN to enable the possibility to connect a user equipment to multiple eNBs.

Example embodiments described herein discuss the use of a selective handover. A selective handover may be a handover of a subset of bearers associated with a user equipment. It should be appreciated that the sub-set may be an empty subset (e.g., zero bearers), any number less than the full set of bearers, or the full set of bearers associated with the user equipment. It should be appreciated herein that a selective handover may comprise a variety of different subcases. Examples of such subcases are provided below.

1) As a first use case, an anchor may keep all bearers, both SRBs and DRBs. Thus, the selective handover may be an empty handover where target is just prepared, and the user equipment synchronizes with the target without handing over any radio bearers.

2) A second use case may be that the anchor keeps all SRBs and some DRBs, while the target receives some DRBs associated with the user equipment via the handover procedure.

3) A third use case may be that the anchor keeps all SRBs, while target is handed over all DRBs.

4) As a fourth use case, the role of the anchor node may be switched. As an example, three methods for the switching of anchors are provided below.

a. According to some of the example embodiments, the target becomes the anchor (i.e., all SRBs are handed over to the target), and all DRBs may remain in source (which is the new assisting node). It should be appreciated that this may be viewed as an opposite scenario of use case 3.

b. According to some of the example embodiments, the target may become the anchor (i.e., all of the SRBs are handed over to the target), and the target may also take some DRBs. Meanwhile, some of the DRBs may still remain at the source. It should be appreciated that this may be viewed as an opposite scenario of use case 2.

c. According to some of the example embodiments, the target becomes the anchor (i.e., all of the SRBs are handed over to the target), and the target also takes all of the DRBs. It should be appreciated, in contrast to a full handover, here a relationship with the source is maintained. It should be appreciated that this may be viewed an opposite scenario of use case 1.

5) As a fifth use case, a selective handover may be provided between to assisting nodes. In this example use case the anchor remains the same, and some DRBs are switched between two the two assisting nodes.

6) As a sixth use case, a split of the control plane in the anchor and assisting node may occur. As an example, three methods for the split are provided.

a. According to some of the example embodiments, the source keeps all DRBs and some SRBs. The target gets some SRBs as a result of the handover procedure.

b. According to some of the example embodiments, the source may keep some of the DRBs and some of the SRBs, while the target receives some of the SRBs and some of the DRBs associated with the user equipment as a result of the selective handover.

c. According to some of the example embodiments, the source may keep some of the SRBs, while the target gets all DRBs and some of the SRBs associated with the wireless terminal as a result of the selective handover.

According to some of the example embodiments, different mechanisms for enabling multiple connectivity between a user equipment and multiple cells are proposed. Some of the example embodiments may also be directed towards the basic concept of a selective handover (e.g., a handover involving a sub-set of user equipment bearers) as well as the required changes in the communication of eNBs involved in the selective handover, and the communication with the user equipment. According to some of the example embodiments, the communication aspects between the eNBs and the CN to enable selective handovers is also presented. For the sake of brevity, the descriptions below treat mostly the case of dual connectivity with two cells, but the ideas are equally applicable for the case where the user equipment is connected to more than two cells at the same time.

With selective handover and multiple connectivity, only the paths of the bearers that are selectively handed over to the target are to be switched. However, as described under the sub-heading 'Handover', legacy MME operation assumes that bearers not comprised in the path switch are to be released and as such, bearer release operation is performed on them.

According to some of the example embodiments, the PATH SWITCH REQUEST message is modified to prevent this. According to some of the example embodiments, the message may be modified to comprise a new IE, for example, Selective Handover, which indicates that the handover is a selective handover. According to some of the example embodiments, the message may be modified to comprise a new IE, for example, E-RAB Not To Be Switched in Downlink List, which explicitly lists the bearers that are to be kept at the source. According to some of the example embodiments, the message may be modified to comprise a new IE, for example, E-RAB To Be Released in Downlink List, which explicitly lists the bearers that are to be released.

When the MME receives a PATH SWITCH REQUEST message with one of these IEs set to true, it will not release the bearers that are to be kept in the source, for example, all the bearers not comprised in the E-RAB To Be Switched in Downlink List in case "Selective Handover" IE is used, or the bearers comprised in the "E-RAB Not To Be Switched in Downlink List" or the bearers not comprised in the "E-RAB To Be Released in Downlink List.

According to some of the example embodiments, the PATH SWITCH REQUEST is kept as in legacy LTE, but the MME is configured, for example, via the OAM system, so to avoid E-RAB terminations for the E-RABs not listed in the PATH SWITCH REQUEST message. The later decision may be taken either unconditionally or depending on source node and target node identities, which may be derived by the Source MME UE S1AP ID IE and Source MME GUMMEI IE in PATH SWITCH REQUEST message and by the ID of the target node that is sending the message. That is, the MME may act differently to the same message depending on the source and target nodes involved in this handover.

According to some of the example embodiments, the MME upon reception of an updated PATH SWITCH REQUEST message that comprises the bearers to be kept at the source node, either implicitly or explicitly as discussed above, will provide these bearers in the "Bearer contexts to be modified" field of the MODIFY BEARER REQUEST message that it is sending to the SGW, but keeping their context information, such as the TEIDs.

According to some of the example embodiments, the MODIFY BEARER REQUEST message is modified to comprise a new IE, for example, "Bearer context to be kept", which is a list similar to the "Bearer context to be released". Specifically, the list comprises only the list of bearer IDs while the "Bearer context to be modified" comprises details of the bearer context. That way, the size of the MODIFY BEARER REQUEST message may be reduced.

In legacy operation, if the path switch was not successful in the CN for some bearers, the MODIFY BEARER RESPONSE comprises these bearers in the "Bearer Contexts marked for removal" field, and the PATH SWITCH REQUEST ACKNOWLEDGE will provide these in the "E-RAB To Be Released List" list. The eNB is then expected to release the corresponding bearers.

According to some of the example embodiments, when the MME gets a MODIFY BEARER RESPONSE that comprises bearers to be removed, it will refrain from removing the bearers, but still provide the bearers in the PATH SWITCH REQUEST ACKNOWLEDGE message that the MME sends to the target. According to some of the example embodiments, the target upon receiving a PATH SWITCH REQUEST ACKNOWLEDGE that comprises some entries in the "E-RAB To Be Released List", communicates this information to the source. This information may be conveyed via a new X2 message.

According to some of the example embodiments, the source, upon receiving such information that certain bearer(s) were not able to be switched to the new target, will decide whether to keep them with itself, for example, considering conditions such as load, the radio link with the concerned user equipment, the QoS requirement of the bearer, etc. The source communicates this decision to the target via a new X2 message. This message may comprise, for example, a list of all the bearers, along with the source's decision to keep the bearer or not.

According to some of the example embodiments, when the target gets a list which shows the bearers that the source is willing to keep or not, it communicates this to the MME, for example, via a new S1 message, and deletes the context of all the bearers.

According to some of the example embodiments, when the MME gets this list, it will release the bearers that the source is not willing to keep, and for those that the source is willing to keep, it will construct a MODIFY BEARER REQUEST that will convey to the CN that the original path is to be restored.

According to some of the example embodiments, a user plane proxy is introduced in the system that hides the switching procedures described above from the core network. That is, the proxy, when receiving a PATH SWITCH message that indicates that the handover that is selective, will short circuit the message, and perform the local switching by itself. That is, from the CN point of the view, the user equipment is still connected to the anchor, and all the data belonging to that user equipment is routed to the anchor via the proxy. However, as the proxy knows which bearers belong to the anchor and which to the assisting node, it will route the data properly to the right node.

According to some of the example embodiments, the proxy is co-located at the anchor node. In this case, if a selective handover is started that requests a switching of the anchor, then the PATH SWITCH REQUEST to be sent to the CN should comprise all the bearers of the user equipment, as the new point of termination of all the bearers from the CN point of view is now the new anchor.

Example Node Configuration

Figure 17:
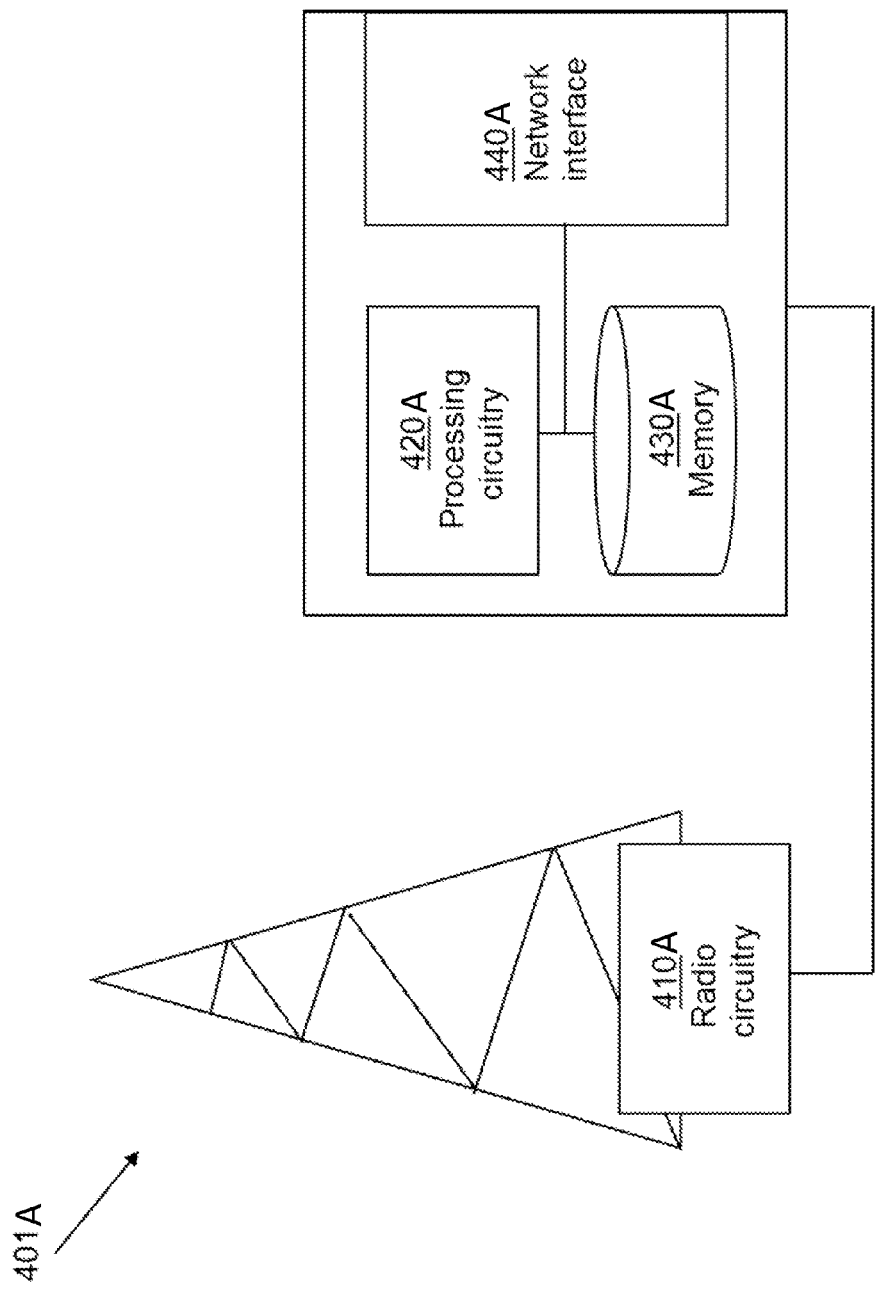
FIG. 17 is an example node configuration of a source base station, according to some of the example embodiments presented herein.

FIG. 17 illustrates an example node configuration of a source base station or eNB 401A which may perform some of the example embodiments described herein. It should be appreciated that the base station illustrated in FIG. 17 may be an anchor or assisting eNB. The base station 401A may comprise radio circuitry or a communication port 410A that may be configured to receive and/or transmit communication data, instructions, and/or messages. It should be appreciated that the radio circuitry or communication port 410A may be comprised as any number of transceiving, receiving, and/or transmitting units or circuitry. It should further be appreciated that the radio circuitry or communication 410A may be in the form of any input or output communications port known in the art. The radio circuitry or communication 410A may comprise RF circuitry and baseband processing circuitry (not shown).

The base station 401A may also comprise a processing unit or circuitry 420A which may be configured to provide a selective handover, or a handover of a sub-set of bearers associated with a user equipment. The processing circuitry 420A may be any suitable type of computation unit, for example, a microprocessor, digital signal processor (DSP), field programmable gate array (FPGA), or application specific integrated circuit (ASIC), or any other form of circuitry. The base station 401A may further comprise a memory unit or circuitry 430A which may be any suitable type of computer readable memory and may be of volatile and/or non-volatile type. The memory 430A may be configured to store received, transmitted, and/or measured data, device parameters, communication priorities, and/or executable program instructions.

Figure 18:
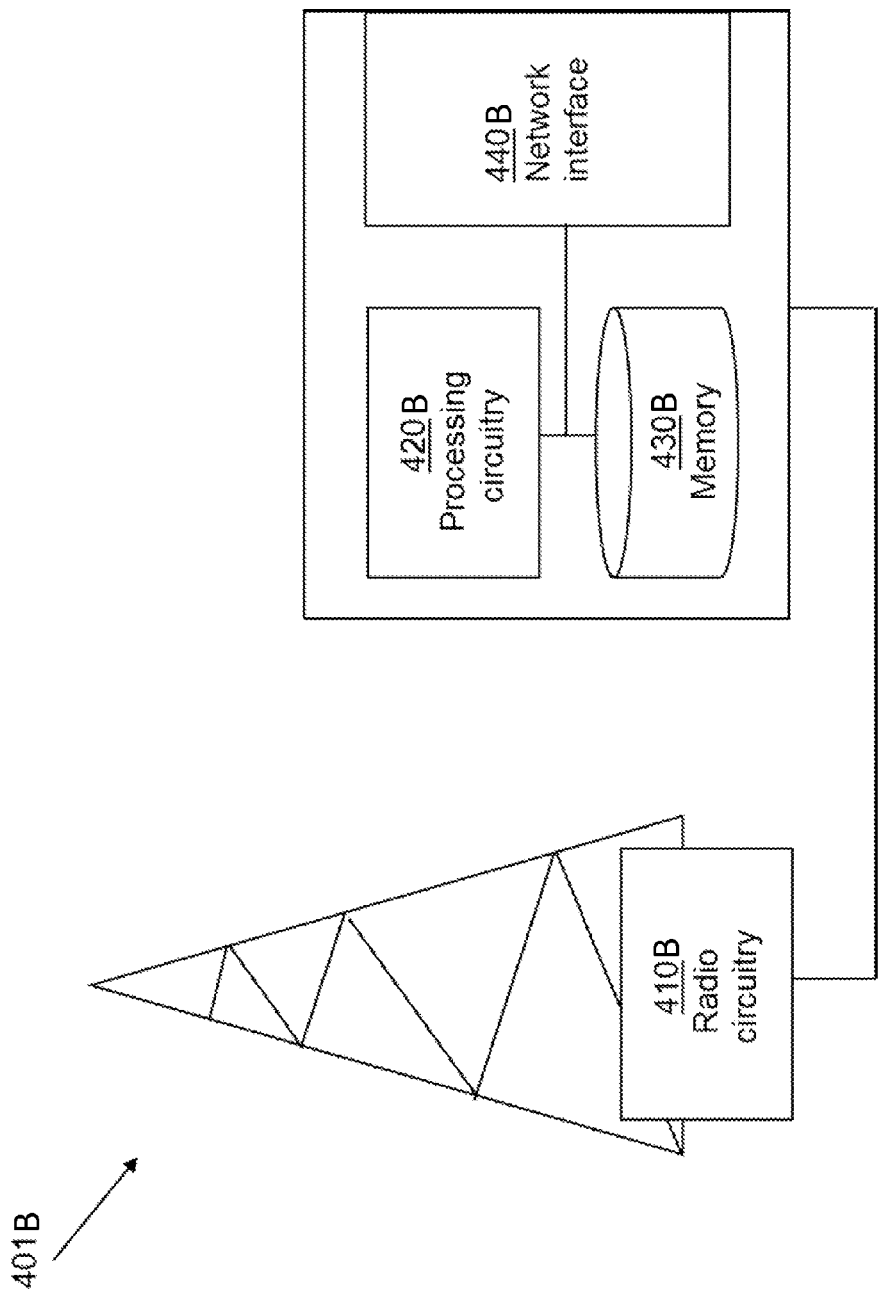
FIG. 18 is an example node configuration of a target base station, according to some of the example embodiments presented herein.

FIG. 18 illustrates an example node configuration of a target base station or eNB 401B which may perform some of the example embodiments described herein. It should be appreciated that the base station illustrated in FIG. 18 may be an anchor or assisting eNB. The base station 401B may comprise radio circuitry or a communication port 410B that may be configured to receive and/or transmit communication data, instructions, and/or messages. It should be appreciated that the radio circuitry or communication port 410B may be comprised as any number of transceiving, receiving, and/or transmitting units or circuitry. It should further be appreciated that the radio circuitry or communication 410B may be in the form of any input or output communications port known in the art. The radio circuitry or communication 410B may comprise RF circuitry and baseband processing circuitry (not shown).

The base station 401B may also comprise a processing unit or circuitry 420B which may be configured to provide a selective handover, or a handover of a sub-set of bearers associated with a user equipment. The processing circuitry 420B may be any suitable type of computation unit, for example, a microprocessor, digital signal processor (DSP), field programmable gate array (FPGA), or application specific integrated circuit (ASIC), or any other form of circuitry. The base station 401B may further comprise a memory unit or circuitry 430B which may be any suitable type of computer readable memory and may be of volatile and/or non-volatile type. The memory 430B may be configured to store received, transmitted, and/or measured data, device parameters, communication priorities, and/or executable program instructions.

Figure 19:
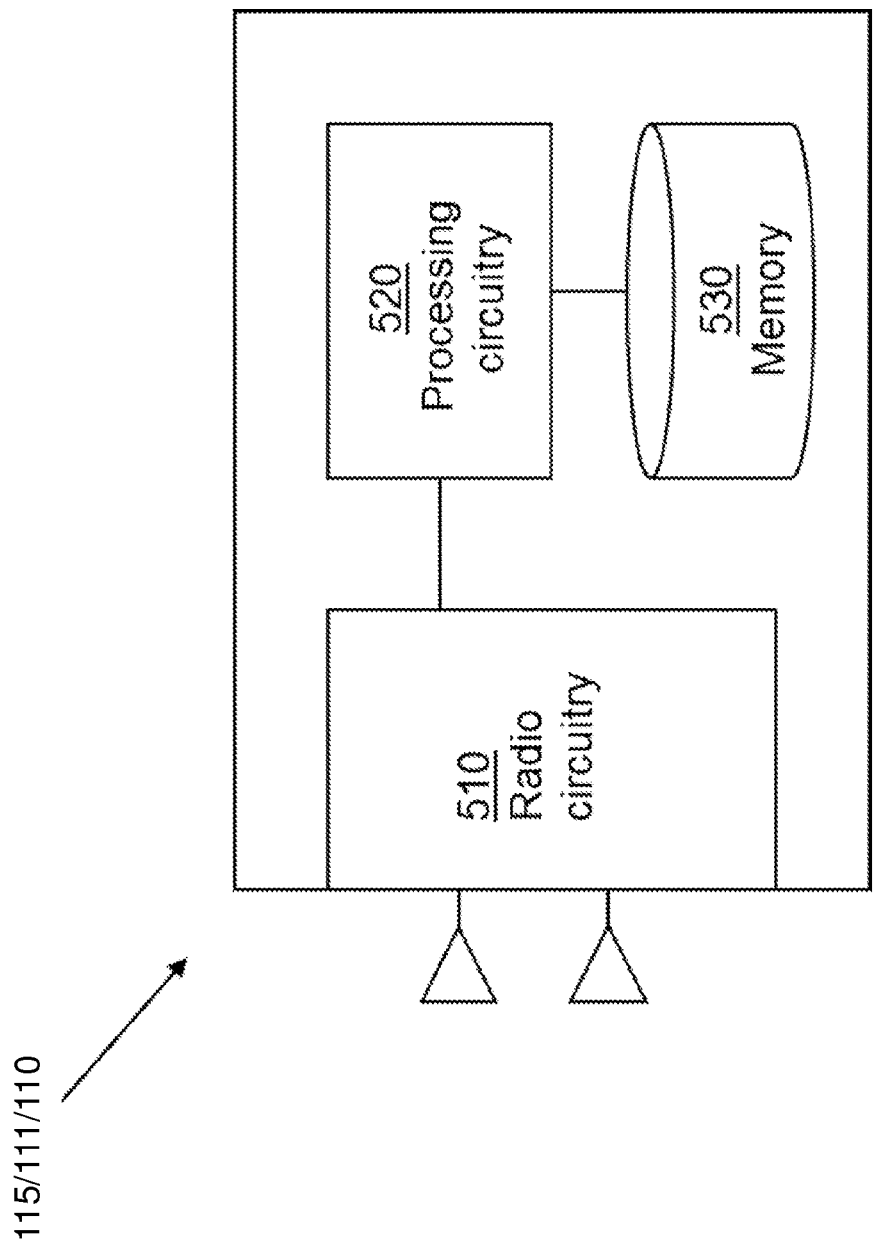
FIG. 19 is an example node configuration of core network node (e.g., MME, SGSN, S4-SGSN), according to some of the example embodiments presented herein.

FIG. 19 illustrates an example node configuration of a core network node. It should be appreciated that the core network node may be a MME 115, a SGSN 111 or a S4-SGSN 110 which may perform some of the example embodiments described herein. The core network node 115, 111 or 110 may comprise radio circuitry or a communication port 510 that may be configured to receive and/or transmit communication data, instructions, and/or messages. It should be appreciated that the radio circuitry or communication port 510 may be comprised as any number of transceiving, receiving, and/or transmitting units or circuitry. It should further be appreciated that the radio circuitry or communication 510 may be in the form of any input or output communications port known in the art. The radio circuitry or communication 510 may comprise RF circuitry and baseband processing circuitry (not shown).

The core network node 115, 111 or 110 may also comprise a processing unit or circuitry 520 which may be configured to provide a path switch request for the sub-set of bearers associated with a user equipment. The processing circuitry 520 may be any suitable type of computation unit, for example, a microprocessor, digital signal processor (DSP), field programmable gate array (FPGA), or application specific integrated circuit (ASIC), or any other form of circuitry. The core network node 115, 111 or 110 may further comprise a memory unit or circuitry 530 which may be any suitable type of computer readable memory and may be of volatile and/or non-volatile type. The memory 530 may be configured to store received, transmitted, and/or measured data, device parameters, communication priorities, and/or executable program instructions.

Example Node Operations

Figure 20:
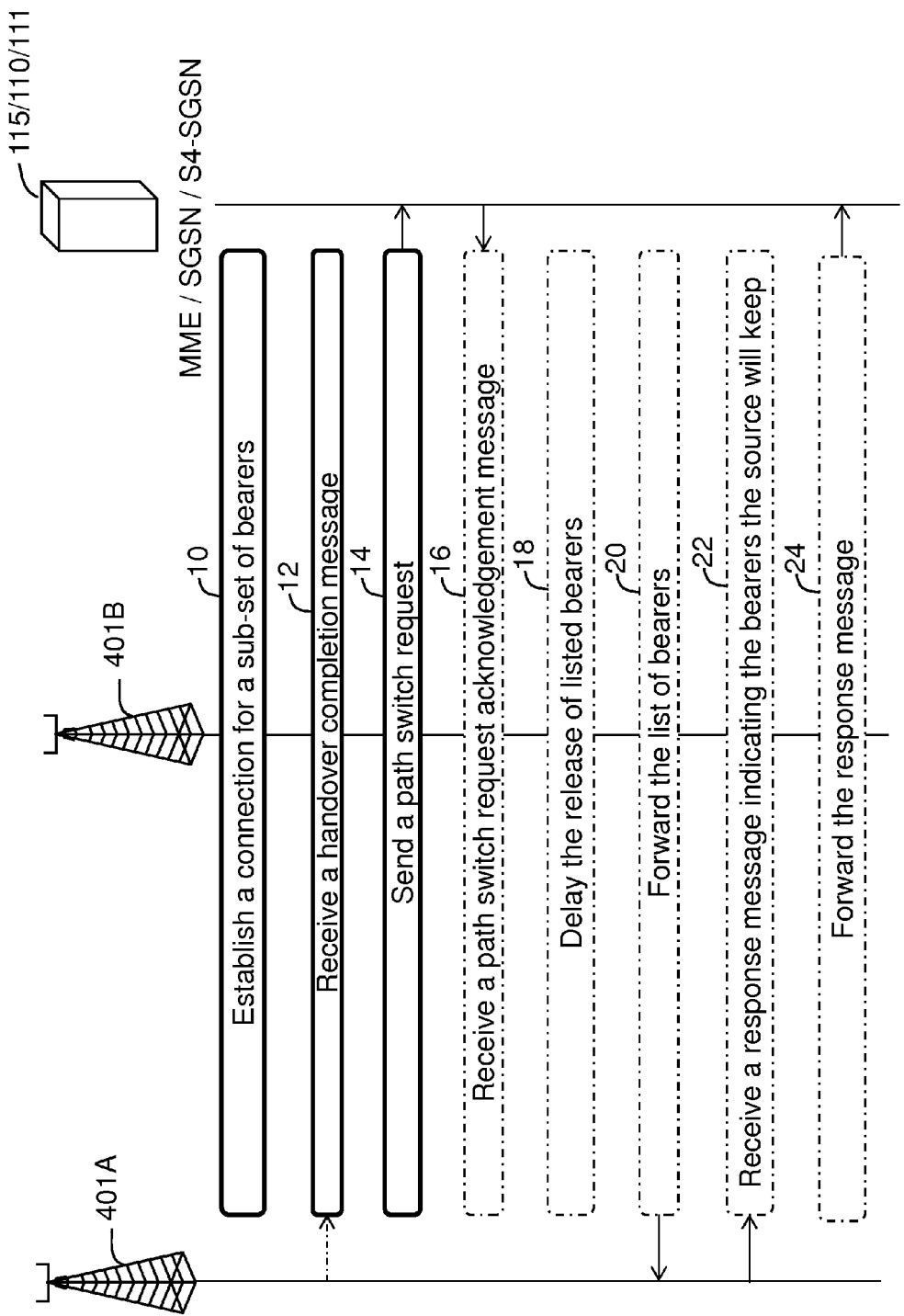
FIG. 20 is a messaging diagram depicting example operations related to the target base station, according to some of the example embodiments presented herein.

FIG. 20 is a flow diagram depicting example operations which may be taken by the target base station 401B as described herein to provide a selective handover, or a handover of a sub-set of bearers associated with a user equipment. It should be appreciated that FIG. 20 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order.

Furthermore, it should be appreciated that not all of the operations need to be performed. The example operations may be performed in any order and in any combination. It should also be appreciated that the actions may be performed by an anchor or assisting base station.

Operation 10

The target base station 401B is configured to establish 10 a connection for a sub-set of bearers associated with a wireless terminal via a selective handover procedure. The processing circuitry 420B is configured to establish the connection for the sub-set of bearers associated with the wireless terminal via the selective handover procedure.

According to some of the example embodiments, the sub-set of bearers may be less than a total number of bearers associated with the wireless terminal. In some example embodiments, the sub-set of bearers may be an empty sub-set (e.g., comprising zero bearers). An empty sub-set of bearers may provide an indication to the target base station that the wireless terminal will initiate a synchronization process with the target base station. It should be appreciated that in a selective handover procedure, at least one bearer associated with the wireless terminal remains connected to the source base station. It should be appreciated that the at least one bearer may be a SRB and/or a DRB. It should be appreciated that the selective handover and the at least one bearer which remains connected to the source base station may further be described by any of the example use cases provided under the heading 'Overview of the example embodiments'.

Operation 12

The target base station 401B is further configured to receive 12, from the source base station 401A or wireless terminal 101, a handover completion message for the sub-set of bearers associated with the wireless terminal. The radio circuitry 410B is configured to receive, from the source base station or wireless terminal, the handover completion message.

Operation 14

The target base station 401B is also configured to send 14, to a core network node 110/111/115, a path switch request. The path switch request comprises an indication that a selective handover was performed, wherein at least one bearer associated with the wireless terminal remains connected to the source base station. The radio circuitry 410B is configured to send, to the core network node, the path switch request.

According to some of the example embodiments, the path switch request may further comprise a list of bearers which are still to be kept established and/or a list of bearers which are to be released with the source base station 401A.

Example Operation 16

According to some of the example embodiments, the target base station may further receive 16, from the core network node, a path switch request acknowledgement message. The path switch request acknowledgement message comprises an E-RAB to be released list. The E-RAB to be released list comprises an identification of at least one bearer the core network node failed to switch to the target base station 401B. The radio circuitry 410B may be configured to receive, from the core network node, the path switch request acknowledgment message.

Example Operation 18

According to some of the example embodiments, the receiving 16 may further comprises delaying 18 a release of bearers listed in the E-RAB to be released list to allow the source base station 401A to maintain an association with the bearers identified in the E-RAB to be released list. The processing circuitry 420B is configured to delay the release of the bearers listed in the E-RAB to be released list.

Example Operation 20

According to some of the example embodiments, the receiving 16 and the delaying 18 may further comprise forwarding 20, to the source base station 401A, the E-RAB to be released list. The radio circuitry 410B is configured to forward, to the source base station, the E-RAB to be released list.

Example Operation 22

According to some of the example embodiments, the forwarding 20 may further comprising receiving 22, from the source base station 401A, a response message. The response message may comprise a decision as to which of the bearers the source base station will keep established within itself. The radio circuitry 410B is configured to receiving, from the source base station, the response message.

Example Operation 24

According to some of the example embodiments, the receiving 22 may further comprise forwarding 24, to the core network node 110/111/115, the response message comprising an identity of bearers to be released from the source base station 401A. The radio circuitry 410B is configured to forward, to the core network node, the response message comprising the identity of bearers to be released from the source base station.

FIG. 20 is a flow diagram depicting example operations which may be taken by the core network node 115, 111 or 110 as described herein to provide a path switch request for the sub-set of bearers associated with a user equipment. It should be appreciated that FIG. 20 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. It should also be appreciated that according to some of the example embodiments, the core network node may be a MME 115, a SGSN 111 or a S4-SGSN 110.

Operation 30

The core network node 110/111/115 is configured to receive 30, from a target base station 401B, a path switch request for the sub-set of bearers associated with the wireless terminal. The path switch request comprises an indication that a selective handover procedure was performed. The radio circuitry 510 is configured to receive, from the target base station, the path switch request for the sub-set of bearers associated with the wireless terminal.

According to some of the example embodiments, the path switch request may further comprise a list of bearers which are still to be kept established and/or a list of bearers which are to be released with the source base station 401A. According to some of the example embodiments, the core network node may be configured to avoid the release of bearers which are not listed in the path switch request message, or bearers which are not comprised in the sub-set of bearers. In contrast, core network nodes of prior art systems are typically configured to interpret any bearers which are not included in the path switch request as an implicit indication to release such bearers.

Operation 32

The core network node 110/111/115 is further configured to maintain 32 an association with bearers (i.e., not to release) which are not comprised in the sub-set of bearers. The processing circuitry 520 is configured to maintain the association with bearers which are not comprised in the sub-set of bearers.

Example Operation 34

According to some of the example embodiments, the maintaining 32 may further comprise releasing 34 bearers which are not to be kept with the source base station 401A or not to be switched to the target base station 401B. The processing circuitry 520 is configured to release bearers which are not to be kept with the source base station 401A or not to be switched to the target base station 401B.

Example Operation 36

According to some of the example embodiments, the core network node 110/111/115 may be further configured to send 36, to the SGW 117 or GGSN 113, a MODIFY BEARER REQUEST. The MODIFY BEARER REQUEST may comprise a list of bearers to be released within the SGW, where bearers which are not comprised in the sub-set of bearers are excluded from the list of bearers to be released. The radio circuitry 510 is configured to send, to the SGW or GGSN, the MODIFY BEARER REQUEST.

Example Operation 38

According to some of the example embodiments, the sending 36 may further comprising receiving 38, from the SGW 117 or GGSN 113, a MODIFY BEARER RESPONSE. The MODIFY BEARER RESPONSE may comprise a list of failed bearers which the SGW was unable to switch, where the failed bearers are marked for release. The radio circuitry 510 is configured to receive, from the SGW or GGSN, the MODIFY BEARER RESPONSE.

Example Operation 39

According to some of the example embodiments, the receiving 38 may further comprise maintaining 39 an association with the failed bearers to allow the source base station 401A to maintain an association with the failed bearers (i.e., to allow the source base station to keep a connection with the failed bearers). The processing circuitry 520 is configured to maintain an association with the failed bearers to allow the source base station to maintain an association with the failed bearers.

Example Operation 40

According to some of the example embodiments, example operations 36-39 may further comprise sending 40, to the target base station 401B and/or source base station 401A, a path switch request acknowledgement message. The path switch request acknowledgement message comprises an E-RAB to be released list. The E-RAB to be released list comprises an identification of the failed bearers, where the bearers which are not comprised in the sub-set of bearers and failed bearers are not comprised in the E-RAB to be released list. The radio circuitry 510 is configured to send, to the target base station 410B and/or source base station 401A, a path switch request acknowledgement message comprising the E-RAB to be released list.

Figure 21:
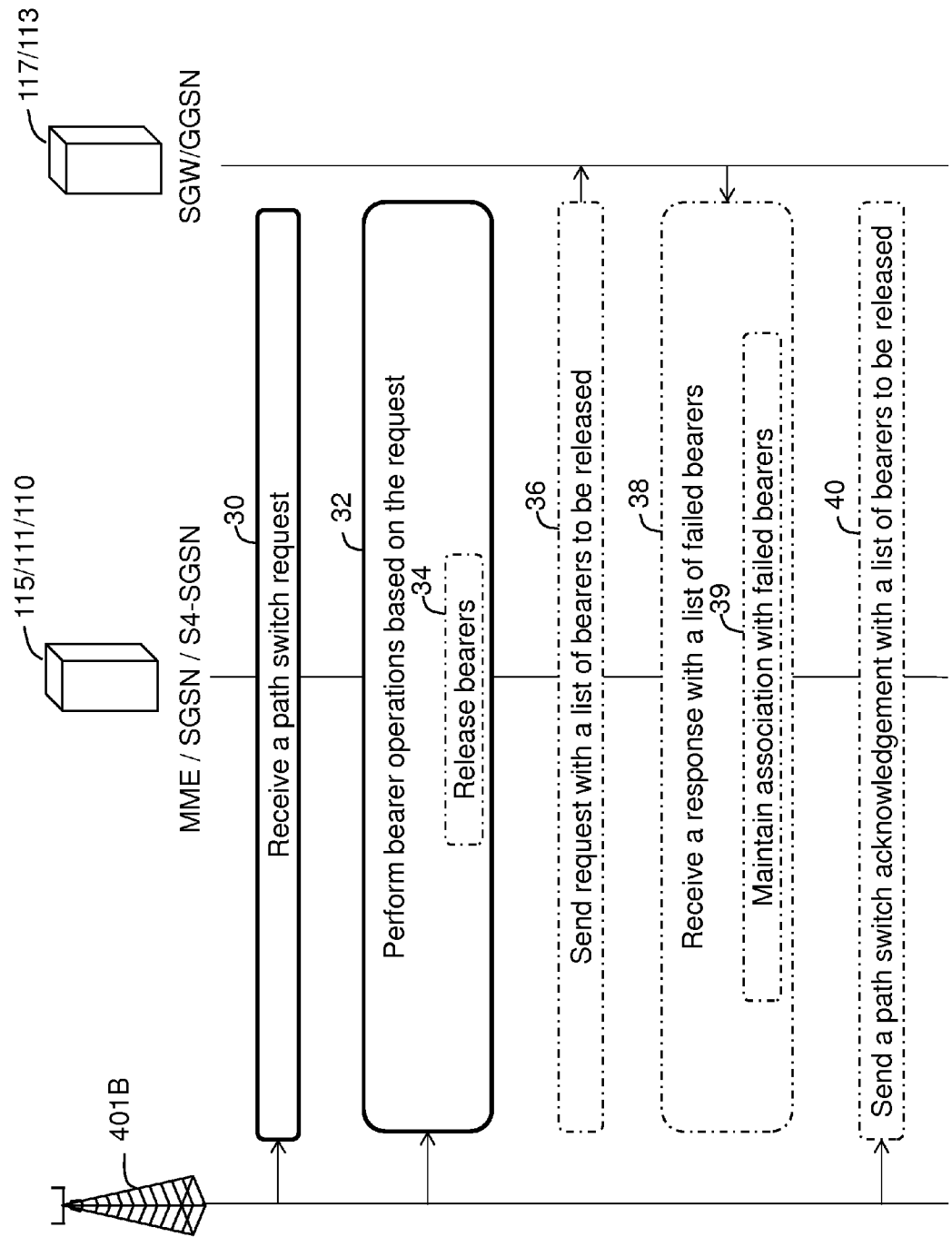
FIG. 21 is a messaging diagram depicting example operations related to the core network node, according to some of the example embodiments presented herein.
Figure 22:
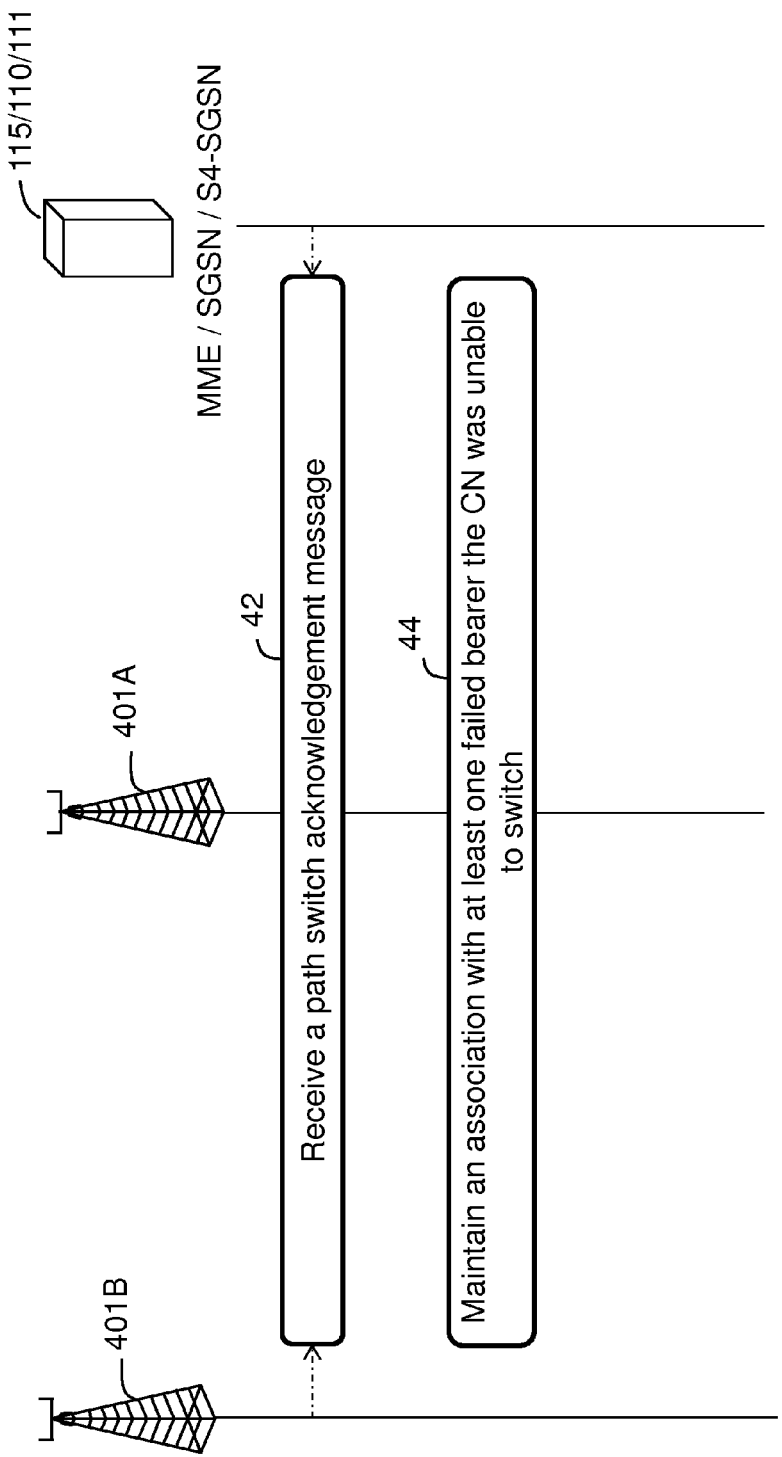
FIG. 22 is a messaging diagram depicting example operations related to the source base station, according to some of the example embodiments presented herein.

FIG. 21 is a flow diagram depicting example operations which may be taken by the source base station 401A as described herein to provide a handover of a sub-set of bearers associated with a wireless terminal. It should be appreciated that FIG. 21 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination.

Operation 42

The source base station 401A is configured to receive 42, from a target base station 401B or a core network node 110/111/115, a path switch acknowledgement message. The path switch acknowledgement message comprises a result of a selective handover procedure for each bearer of the sub-set of bearers. The radio circuitry 410A is configured to receive, from the target base station or the core network node, the path switch acknowledgement message.

Operation 44

The source base station 401A is further configured to maintain 44 an association of at least one failed bearer, or the sub-set of bearers. The at least one failed bearer is a bearer in which the core network node 110/111/115 was unable to switch to the target base station 401B via the selective handover procedure. The processing circuitry 420A is configured to maintain the association of the at least one failed bearer.

GENERAL STATEMENTS

It should be noted that although terminology from 3GPP LTE has been used herein to explain the example embodiments, this should not be seen as limiting the scope of the example embodiments to only the aforementioned system.

Other wireless systems, comprising HSPA, WCDMA, WiMax, UMB, WiFi and GSM, may also benefit from the example embodiments disclosed herein. It should also be appreciated that the term bearer (pre-existing, primary or auxiliary) represents a Data Radio Bearer (DRB) and/or an EPS Radio Bearer.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices, wireless terminals or machine-to-machine devices.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a target base station, for providing a handover of a sub-set of radio bearers associated with a wireless terminal, said sub-set of radio bearers being less than or equal to all radio bearers associated with the wireless terminal, the method comprising:
   establishing a connection for the sub-set of radio bearers associated with the wireless terminal via a selective handover procedure;
   receiving, from a source base station or a wireless terminal, a handover completion message for the sub-set of radio bearers associated with the wireless terminal; and
   sending, to a core network node, a path switch request, said path switch request comprising an indication that a selective handover procedure was performed, wherein at least one radio bearer associated with the wireless terminal remains connected to the source base station;
   wherein the path switch request further comprises at least one of: a list of which radio bearers from among the all radio bearers that are to be kept at the source base station, and a list of which radio bearers from among the all radio bearers that are to be released at the source base station.

2. The method of claim 1, further comprising:
   receiving, from the core network node, a path switch request acknowledgement message, wherein the path switch request acknowledgement comprises an Evolved Universal Terrestrial Radio Access Network Radio Access Bearer, E-RAB, to be released list, said E-RAB to be released list comprising an identification of at least one radio bearer the core network node failed to switch to the target base station; and
   delaying a release of bearers listed in the E-RAB to be released list to allow the source base station to maintain an association with the radio bearers identified in the E-RAB to be released list.

3. The method of any of claim 2, further comprising forwarding, to the source base station, the E-RAB to be released list.

4. The method of claim 3, further comprising receiving, from the source base station, a response message, said response message comprising a decision as to which of the radio bearers the source base station will keep established within itself.

5. The method of claim 4, further comprising forwarding, to the core network node, the response message comprising an identity of radio bearers to be released from the source base station.

6. A target base station for providing a handover of a sub-set of radio bearers associated with a wireless terminal, said sub-set of radio bearers being less than or equal to all radio bearers associated with the wireless terminal, the target base station comprising:

processing circuitry configured to establish a connection for the sub-set of radio bearers associated with the wireless terminal via a selective handover procedure;

radio circuitry configured to receive, from a source base station or a wireless terminal, a handover completion message for the sub-set of radio bearers associated with the wireless terminal; and the radio circuitry further configured to send, to a core network node, a path switch request, said path switch request comprising an indication that a selective handover procedure was performed, wherein at least one radio bearer associated with the wireless terminal remains connected to the source base station;

wherein the path switch request further comprises at least one of: a list of which radio bearers from among the all radio bearers that are to be kept at the source base station, and a list of which radio bearers from among the all radio bearers that are to be released at the source base station.

7. The target base station of claim 6, wherein the radio circuitry is further configured to receive, from the core network node, a path switch request acknowledgement message, wherein the path switch request acknowledgement comprises an Evolved Universal Terrestrial Radio Access Network Radio Access Bearer, E-RAB, to be released list, said E-RAB to be released list comprising an identification of at least one radio bearer the core network node failed to switch to the target base station; and the processing circuitry is further configured to delay the release of radio bearers listed in the E-RAB to be released list to allow the source base station to maintain an association with the radio bearers identified in the E-RAB to be released list.

8. The target base station of claim 7, wherein the radio circuitry is further configured to send, to the source base station, the E-RAB to be released list.

9. The target base station of claim 8, wherein the radio circuitry is further configured to receive, from the source base station, a response message, said response message comprising a decision as to which of the radio bearers the source base station will keep established within itself.

10. The target base station of claim 9, wherein the radio circuitry is further configured to forward, to the core network node, the response message comprising an identity of radio bearers to be released from the source base station.

11. The target base station of claim 6, wherein the core network node is a Mobility Management Entity, MME, Serving General Packet Radio Service Support Node, SGSN, or a S4-SGSN.

12. A method, in a core network node, for providing a path switch or relocation of a sub-set of radio bearers associated with a wireless terminal, said sub-set of radio bearers being less than all radio bearers associated with the wireless terminal, the method comprising:

receiving, from a target base station, a path switch request for the sub-set of radio bearers associated with the wireless terminal, said path switch request comprising an indication that a selective handover procedure was performed; and maintaining an association with radio bearers which are not comprised in the sub-set of radio bearers;

wherein the path switch request further comprises at least one of: a list of which radio bearers from among the all radio bearers that are to be kept at the source base station, and a list of which radio bearers from among the all radio bearers that are to be released at the source base station.

13. The method of claim 12, wherein the performing further comprises releasing radio bearers which are not to be kept with the source base station or not to be switched to the target.

14. The method of claim 12, wherein the core network node is configured to avoid the release of radio bearers not listed in the path switch request message.

15. The method of claim 12, further comprising:

sending, to a Serving Gateway, SGW, or Gateway General Packet Radio Service Support Node, GGSN, a MODIFY BEARER REQUEST, said MODIFY BEARER REQUEST comprising a list of radio bearers which the core network node was unable to switch to the target base station, wherein said MODIFY BEARER REQUEST further comprises an indication of failed radio bearers which are unable to be switched and will remain with the source base station.

16. The method of claim 15, further comprising:

receiving, from the SGW or GGSN, a MODIFY BEARER RESPONSE, said MODIFY BEARER RESPONSE comprising a list of failed radio bearers which are marked for release; and maintaining an association with said failed radio bearers to allow the source base station to maintain an association with the failed radio bearers.

17. The method of claim 15, further comprising sending, to the target base station and/or source base station, a path switch request acknowledgement message, said path switch request acknowledgement message comprising an Evolved Universal Terrestrial Radio Access Network Radio Access Bearer, E-RAB, to be released list, said E-RAB to be released list comprising an identification of the failed radio bearers.

18. A core network node, for providing a path switch or relocation of a sub-set of radio bearers associated with a wireless terminal, said sub-set of radio bearers being less than all radio bearers associated with the wireless terminal, the core network node comprising:

radio circuitry configured to receive, from a target base station, a path switch request for the sub-set of radio bearers associated with the wireless terminal, said path switch request comprising an indication that a selective handover procedure was performed; and processing circuitry configured to maintain an association with radio bearers which are not comprised in the sub-set of radio bearers;

wherein the path switch request further comprises at least one of: a list of which radio bearers from among the all radio bearers that are to be kept at the source base station, and a list of which radio bearers from among the all radio bearers that are to be released at the source base station.

19. The core network node of claim 18, wherein the processing circuitry is further configured to release radio bearers which are not to be kept with the source base station or not to be switched to the target.

20. The core network node of claim 18, wherein the core network node is configured to avoid the release of radio bearers not listed in the path switch request message.

21. The core network node of claim 18, wherein the radio circuitry is further configured to send, to a Serving Gateway, SGW, or Gateway General Packet Radio Service Support Node, GGSN, a MODIFY BEARER REQUEST, said MODIFY BEARER REQUEST comprising a list of radio bearers which the core network node was unable to switch to the target base station, wherein said MODIFY BEARER REQUEST further comprises an indication of failed radio bearers which are unable to be switched and will remain with the source base station.

22. The core network node of claim 21, wherein the radio circuitry is further configured to receive, from the SGW or GGSN, a MODIFY BEARER RESPONSE, said MODIFY BEARER RESPONSE comprising a list of failed radio bearers which are marked for release, and the processing circuitry is further configured to maintain an association with said failed radio bearers to allow the source base station to maintain an association with the failed radio bearers.

23. The core network node of claim 22, wherein the radio circuitry is further configured to send, to the target base station and/or the source base station, a path switch request acknowledgement message, said path switch request acknowledgement message comprising an Evolved Universal Terrestrial Radio Access Network Radio Access Bearer, E-RAB, to be released list, said E-RAB to be released list comprising an identification of the failed radio bearers.

24. The core network node of claim 18, wherein the core network node is a Mobility Management Entity, MME, Serving General Packet Radio Service Support Node, SGSN, or a S4-SGSN.

25. A source radio base station comprising:
communication circuitry; and
processing circuitry configured to:
perform a selective handover of a wireless terminal towards a target base station, wherein a set of radio bearers is in use at the source base station for the wireless terminal and wherein the selective handover comprises attempting to hand over a selected first sub-set of the radio bearers in the set, while retaining a second sub-set of the radio bearers in the set of radio bearers, for use with the wireless terminal after the selective handover;
receive, via the communication circuitry, a path switch acknowledgement message indicating results of the selective handover;
determine from a path switch acknowledgment message that the target base station failed to establish at least one of the radio bearers in the selected first subset, each such radio bearer being referred to as a failed radio bearer; and
in addition to retaining the second sub-set of radio bearers in the set of radio bearers at the source base station for use with the wireless terminal, further retain at least one failed radio bearer at the source base station, for use with the wireless terminal after selective handover.

26. A method at a source radio base station comprising:
performing a selective handover of a wireless terminal towards a target base station, wherein a set of radio bearers is in use at the source base station for the wireless terminal and wherein the selective handover comprises attempting to hand over a selected first sub-set of the radio bearers in the set, while retaining a second sub-set of the radio bearers in the set of radio bearers, for use with the wireless terminal after the selective handover;
determining from a path switch acknowledgment message that the target base station failed to establish at least one of the radio bearers in the selected first subset, each such radio bearer being referred to as a failed radio bearer; and
in addition to retaining the second sub-set of radio bearers in the set of radio bearers at the source base station for use with the wireless terminal, further retaining at least one failed radio bearer at the source base station, for use with the wireless terminal after selective handover.

* * * * *